(12) United States Patent
Yoshiwaka

(10) Patent No.: US 9,364,008 B2
(45) Date of Patent: Jun. 14, 2016

(54) PIZZA BASE SHAPING TOOL AND PIZZA BASE SHAPING METHOD

(71) Applicant: Syugo Yoshiwaka, Matsudo (JP)

(72) Inventor: Syugo Yoshiwaka, Matsudo (JP)

( * ) Notice: Subject to any disclaimer, the term of this patent is extended or adjusted under 35 U.S.C. 154(b) by 0 days.

(21) Appl. No.: 14/411,066

(22) PCT Filed: Jun. 5, 2013

(86) PCT No.: PCT/JP2013/065550
§ 371 (c)(1),
(2) Date: Dec. 23, 2014

(87) PCT Pub. No.: WO2014/002714
PCT Pub. Date: Jan. 3, 2014

(65) Prior Publication Data
US 2015/0335035 A1    Nov. 26, 2015

(30) Foreign Application Priority Data

Jun. 28, 2012 (JP) ................................. 2012-158075
Oct. 1, 2012 (JP) ................................. 2012-219861

(51) Int. Cl.
*A21C 11/00* (2006.01)
*A47J 43/20* (2006.01)
(Continued)

(52) U.S. Cl.
CPC ............. *A21C 11/006* (2013.01); *A21C 11/004* (2013.01); *A21C 11/10* (2013.01); *A21D 13/007* (2013.01); *A21D 17/002* (2013.01); *A47J 43/20* (2013.01)

(58) Field of Classification Search
CPC .... A21C 11/006; A21C 11/10; A21C 11/004; A47J 43/20; A21D 13/007; A21D 17/002

USPC ................................................... 426/502
See application file for complete search history.

(56) References Cited

U.S. PATENT DOCUMENTS 1,757,447 A * 5/1930 Comstock ................ A22C 7/00
425/318
2,206,207 A * 7/1940 Taylor ................... B26B 29/063
269/54.5
(Continued)

FOREIGN PATENT DOCUMENTS

JP    59-108535 U    7/1984
JP    61-005230 Y2   2/1986
(Continued)

OTHER PUBLICATIONS

International Search Report dated Aug. 27, 2013, issued in corresponding application No. PCT/JP2013/065550.
(Continued)

*Primary Examiner* — Steven Leff
(74) *Attorney, Agent, or Firm* — Westerman, Hattori, Daniels & Adrian, LLP

(57) ABSTRACT

A pizza base shaping tool and a pizza base shaping method are provided that are capable of simply shaping a thin circular plate-shaped pizza base using sliced bread pieces. The pizza base shaping tool includes: a die receiver which serves as a seat; a cutting die which presses and shapes the bread piece; and a circular slipping sheet which is disposed between the die receiver and the cutting die, wherein the die receiver includes a disk-shaped placement base for placing the bread piece thereon, the cutting die includes a pressing plate which compresses the bread from the upside and a cutting die blade which is provided so as to protrude in a direction perpendicular to a pressing surface of the pressing plate and is used to cut the bread piece into the predetermined diameter, and the slipping sheet is positioned to the bread piece placed on the placement base.

18 Claims, 21 Drawing Sheets

(51) Int. Cl.
*A21C 11/10* (2006.01)
*A21D 13/00* (2006.01)
*A21D 17/00* (2006.01)

(56) References Cited

U.S. PATENT DOCUMENTS

| | | | | |
|---|---|---|---|---|
| 3,166,027 | A * | 1/1965 | Sprenzel | A21C 11/008 425/183 |
| 3,671,008 | A * | 6/1972 | Villalba, Jr. | A21C 11/008 249/155 |
| 3,958,797 | A * | 5/1976 | Brow | A21C 11/008 269/302.1 |
| 4,009,857 | A * | 3/1977 | Delmas | A21C 11/008 249/102 |
| 4,081,169 | A * | 3/1978 | Lauter | A21C 11/008 249/115 |
| 4,522,580 | A * | 6/1985 | Poister | A21C 3/02 425/193 |
| 4,984,979 | A * | 1/1991 | Hari | A21C 3/02 425/263 |
| 6,010,325 | A * | 1/2000 | Lawrence | A21C 11/006 425/364 R |
| 8,360,410 | B1 * | 1/2013 | Rockwood | A21C 11/00 269/289 R |
| 2005/0072317 | A1 * | 4/2005 | Thorstad | A47J 43/20 99/450.1 |
| 2005/0276895 | A1 | 12/2005 | Fuchi et al. | |
| 2014/0023745 | A1 * | 1/2014 | Galluch | B65D 81/343 426/8 |

FOREIGN PATENT DOCUMENTS

| | | |
|---|---|---|
| JP | 61-115436 A | 6/1986 |
| JP | 02-020399 B2 | 5/1990 |
| JP | 2006-000154 A | 1/2006 |
| JP | 2006-006446 A | 1/2006 |
| JP | 3811790 B1 | 8/2006 |
| JP | 2006-304769 A | 11/2006 |
| JP | 2009-171848 A | 8/2009 |
| JP | 2010-075638 A | 4/2010 |

OTHER PUBLICATIONS

"Cookingoo (No. 100-253-015)", Dinos Living 11-12 (Fall/Winter edition), Dinos Cecile Co., Ltd., Japan, Jul. 22, 2011, vol. 124, pp. 70.

* cited by examiner

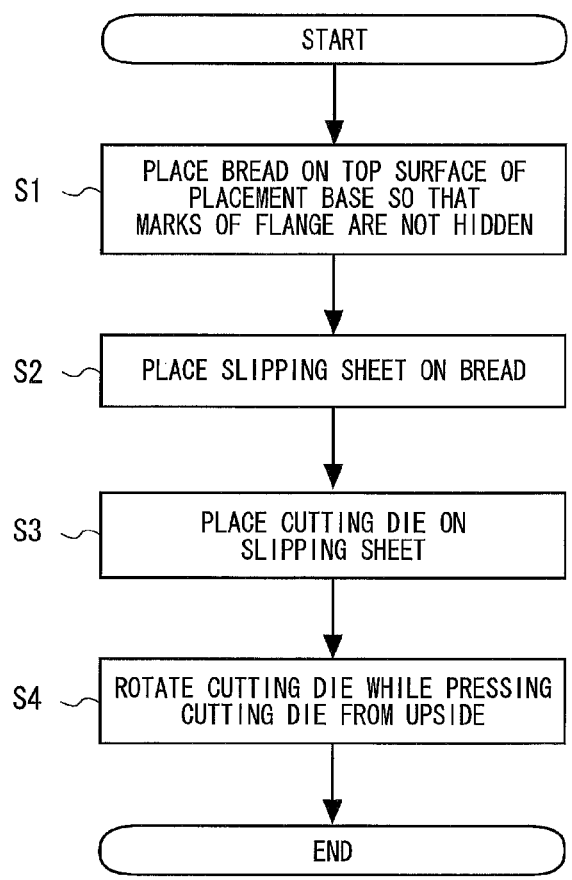

FIG. 8
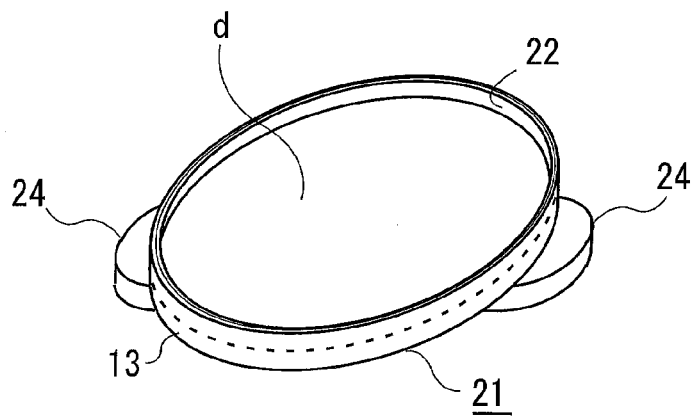
FIG. 9
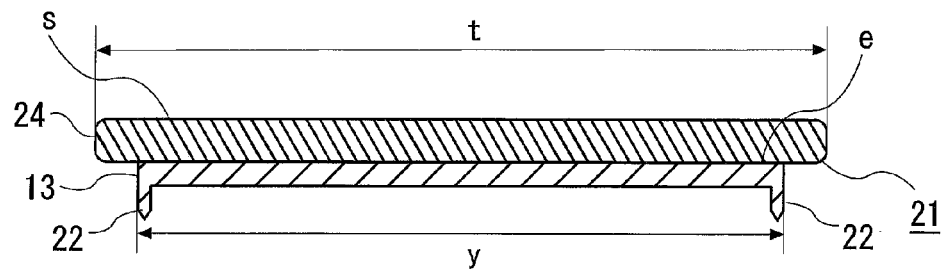
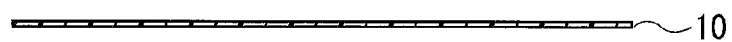
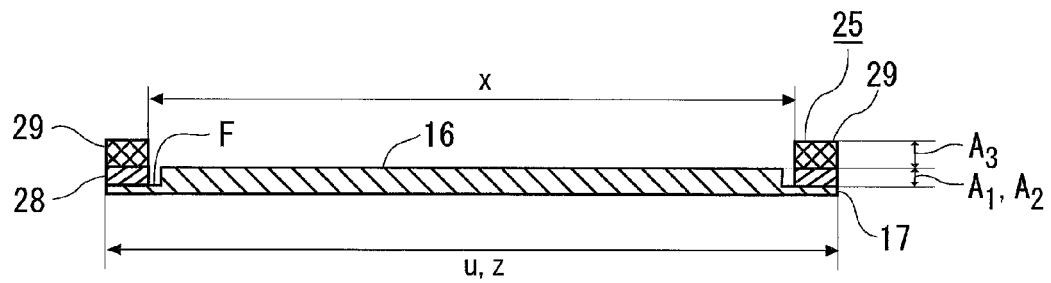

US 9,364,008 B2

PIZZA BASE SHAPING TOOL AND PIZZA BASE SHAPING METHOD

TECHNICAL FIELD

The present invention relates to a tool that makes a pizza base by using a sliced bread piece, and particularly, to a pizza base shaping tool and a pizza base shaping method that press and cut bread to shape a circular and thin plate-shaped pizza base so that an authentic circular pizza base having a crisp texture is made by using a food material obtained at home. In addition, a large pizza base can be made by connecting a plurality of sliced bread pieces so that many fillings are placed on the pizza base having a good-looking size.

BACKGROUND ART

As a device that makes a pizza base in the related art, there is known a device that flatly extends dough into a desired shape before baking (for example, see JP 3811790 B1 and JP 2009-171848 A). Further, as a tool that shapes sliced bread, there is known a tool that makes a sealed sandwich by using a shaping frame (for example, see Japanese Utility Model Application Publication No. 61-5230, JP 2006-6446 A, and JP 2010-75638 A) or a tool that finishes a food material such as sliced bread in a flat shape while the food material is pressed and heated (for example, see Non-Patent Literature 1).

The "dough shaping device" of JP 3811790 B1 includes a shaping frame which surrounds dough, a cutting die in which a plurality of rollers are radially disposed such as to be adjacent to the inner circumferential surface of the shaping frame and are attached such as to be rotatable in a cantilever state, and a driving unit which rotationally drives the cutting die such that the roller rotates along the inner circumferential surface of the shaping frame, wherein a bottom surface portion of the cutting die is formed in a plane shape and is attached such as to be rotatable about a rotation shaft of the cutting die, and wherein the roller is formed in a truncated conical shape of which the diameter increases outward from the rotation center of the cutting die and rolls on the plane bottom surface portion while the outermost end thereof comes into contact with the lateral inner circumferential surface.

The "dough stretching device" of JP 2009-171848 A is a dough stretching device including a plurality of shaping frames which moves close to or away from each other radially at the outside of a revolution track of a conical or truncated conical stretching roller having a small diameter at the inside and a large diameter at the outside with respect to the radial direction about the revolution axis around which the stretching roller for stretching nodule dough in a flat shape revolves, the inner circumferential surface of the shaping frame facing the stretching roller is formed in a shaping surface of which the lower side is enlarged outward compared to the upper side, and the peripheral edge of the dough stretched to be enlarged outward by the stretching roller is guided downward so as to suppress being placed onto the top surface of the shaping frame.

The "sealed sandwich shaping frame" of Japanese Utility Model Application Publication No. 61-5230 is used to form a sealed sandwich only by a single shaping frame without using a lower frame needed in the past. In that document, the outer peripheral wall of the shaping frame is provided with a step portion and sharp teeth, the shaping frame is pressed from the upside of two sliced bread pieces placed on a substrate in an overlap state so that the circumferences of the sliced bread pieces are cut by the sharp teeth, and the sliced bread pieces are pressed against the substrate by the step portion. Then, the circumferences of the cut sliced bread pieces are pressed so that the circumferences are bonded to each other. Hence, a sealed sandwich may be made.

The "bread shaping tool" of JP 2006-6446 A is used for a child to simply make a sealed sandwich by facilitating an operation of cleaning the bread shaping tool after the usage thereof. In that document, a punching die having a predetermined shape is detachably disposed on a tray on which two sliced bread pieces are disposed in an overlap state, the center of the punching die is provided with an opening, a shaping frame is circumferentially provided at the outside of the opening, the outer periphery of the end surface of the shaping frame is provided with a cutting portion, the inner periphery thereof is provided with a pressing portion, the front end of the tray is provided with a pressing plate which is rotatable to press the sliced bread pieces on the tray, the tool body is provided with a conveying mechanism which conveys the tray from the inlet thereof to the outlet thereof, and the conveying mechanism is provided with a pressing member that presses the sliced bread pieces on the tray against the punching die.

The "sandwich shaping tool" of JP 2010-75638 A is used to simply and reliably make a sandwich by separately providing a die member for a compressing and fixing operation and a die member for cutting the peripheral portion thereof. In that document, a slight difference in time is kept in the relation between a pressure-bonding and a fixing operation of causing a pressing portion of an inner die body to pressure-bond the circumferential edges of the upper and lower sliced bread pieces interposing the fillings therebetween and pressure-fix the circumferential edges and a cutting operation of causing a cutting blade of an outer die body to cut the outer circumferential edges in the pressure-bonded and fixed state. Accordingly, the circumferential edges of the upper and lower sliced bread pieces are reliably cut and bonded to each other.

The cooking tool (see FIG. 23) of Dinos Living 11-12 (Fall/Winter edition) issued by Dinos Co., Ltd. on Jul. 22, 2011, Vol. 124, P 70 (hereafter, Dinos Living) is a tool which openably connects two plate-shaped frying pans having the same shape and equipped with handles through a hinge. In that document, a food material such as sliced bread is placed on one plate-shaped frying pan, and the other frying pan presses the food material between the two frying pans. At this time, when the food material is heated by a stove in a pressed state, the food material is heated and processed in a flat shape.

CITATION LIST

Patent Documents

1. JP 3811790 B1;
2. JP 2009-171848 A;
3. Japanese Utility Model Application Publication No. 61-5230;
4. JP 2006-6446 A; and
5. JP 2010-75638 A.

Non-Patent Documents

1. Dinos Living 11-12 (Fall/Winter edition) issued by Dinos Co., Ltd. on Jul. 22, 2011, Vol. 124, P 70.

SUMMARY OF THE INVENTION

Technical Problem

In the past, a pizza was made at home by spending time and effort using dough made from materials such as hard flour, weak flour, salt, dry yeast, olive oil, and hot water or there was a need to buy a pizza base available in the market. Thus, the pizza was not simply made. Further, a pizza-like toast could be made by placing fillings onto commercially available sliced bread. However, this toast has a texture that is completely different from an authentic pizza, and also has a difference in appearance. Furthermore, there is no tool that is capable of simply making a pizza having the same texture as an authentic pizza and having a good-looking size by using food material that is commonly obtained at home.

In this regard, the devices disclosed in the above-mentioned JP 3811790 B1 and JP 2009-171848 A documents were used to stretch a pizza dough into a flat shape before baking. In this case, however, the bread is not shaped as a pizza base, and the devices are not simply used at home.

Furthermore, the tools disclosed in Japanese Utility Model Application Publication No. 61-5230, JP 2006-6446 A, and JP 2010-75638 A are used to make a sealed sandwich from sliced bread by using a shaping frame or the like. However, these tools are not tools for shaping the sliced bread as a pizza base.

As illustrated in FIG. 23, the tool of the above-mentioned Dinos Living Non-Patent Document is a tool that makes flat food by pressing a food material such as sliced bread using two frying pans having the same shape, and heating the food material. For example, when a hot sandwich needs to be made, the sliced bread is heated in a pressed state, and hence the sliced bread may be shaped in a flat shape while the texture and the thickness of the sliced bread are left. However, since the sliced bread is nipped by the gripping power of the hand so that the gap between two handles decreases, a problem arises in that the sliced bread may not be shaped into a thin plate shape having the texture of a pizza base when the pressure is weak. Furthermore, the pizza base may not be shaped into a circular shape like the typical shape of a pizza dough. Furthermore, when the sliced bread obtained by baking the dough is heated by the tool and is further heated by an oven while the fillings are placed thereon, there is a concern that the sliced bread may be burned.

Additionally, in order to make a good-looking authentic pizza, there is a need to shape a large-sized circular pizza base. The large-sized pizza base may be shaped by partially overlapping a plurality of bread pieces.

However, the tool of the Dinos Living Non-Patent Document does not have a pressure for shaping a thin plate-shaped pizza base having the same texture as the authentic pizza base as described above. Furthermore, the tool does not have a function of connecting a plurality of bread pieces necessary for shaping the large-sized pizza base or shaping the connected bread pieces into a circular shape.

The present invention solves the above-described problems. That is, an object of the present invention is to provide a pizza base shaping tool and a pizza base shaping method capable of shaping a thin disk-shaped pizza base by pressing a sliced bread piece and cutting the end thereof. Furthermore, it is possible to make a large-sized pizza base by connecting a plurality of bread pieces. Furthermore, it is possible to simply make a pizza having a real form and size and having an authentic texture at home by making a circular pizza base having a large size and an authentic texture using food material commonly obtained at home.

Solutions to the Problem

The pizza base shaping tool and the pizza base shaping method according to the present invention solve the above-described problems, as discussed below.

According to one aspect of the present invention, there is provided a pizza base shaping tool that presses a sliced bread piece and cuts a circumferential edge thereof so as to shape a disk-shaped pizza base having a predetermined diameter, the pizza base shaping tool including: a die receiver which serves as a seat; a cutting die which presses and shapes the bread piece; and a circular slipping sheet which is disposed between the die receiver and the cutting die and has substantially the same diameter as the predetermined diameter, wherein the die receiver includes a disk-shaped placement base having the predetermined diameter and used to place the bread piece thereon, the cutting die includes a pressing plate which compresses the bread from the upside and a cutting die blade which is provided so as to protrude in a direction perpendicular to a pressing surface of the pressing plate and is used to cut the bread piece into the predetermined diameter, and when the slipping sheet is positioned to the bread piece placed on the placement base so as to cover the bread piece and is pressed and rotated while the cutting die covers the slipping sheet from the upside, the pressing plate compresses the bread piece while slipping on the slipping sheet and the bread exceeding from the placement base is cut by the cutting die blade.

Here, the "a sliced bread piece" is not limited to the rectangular or mountain-shaped sliced bread piece as long as the sliced shapes may partially overlap one another. For example, brioche or croissant and the like may be sliced. Further, the "a sliced bread piece" may be made as various types such that the bread piece has a different combination of fresh cream, butter, and eggs or the bread piece is obtained by adding grapes, walnut, rye, or brown rice.

The pressing surface of the pressing plate is desirably provided with a convex portion for concentrating a pressing force, and the slipping sheet has desirably flexibility and smoothly moves the convex portion. Further, the convex portion may be a protrusion which extends from a portion serving as a center of the pressing plate when the pressing plate is rotated to a circumferential edge thereof.

The die receiver may further include a flange which extends outward from a circumferential edge of a lower end of the placement base and a guide which protrudes upward from a top surface of the flange, and the guide may be adapted to guide a position when the cutting die covers the placement base on which the bread and the slipping sheet are placed. The guide may be adapted to perform a positioning when the rectangular bread piece is placed on the placement base.

A top surface of the placement base may have a non-slip structure that disturbs a movement of the placed bread piece when the cutting die is rotated. Further, the cutting die may further include a substantially plate-shaped handle which is provided in the top surface of the pressing plate, and the handle may include a portion which protrudes outward from a circumferential edge of the pressing plate so that the handle is pressed downward by a palm from a position substantially just above the cutting die blade.

According to another aspect of the present invention, there is provided a pizza base shaping method of making a disk-shaped pizza base having a predetermined diameter by using a plurality of sliced bread pieces, the pizza base shaping method including: placing the bread pieces onto a top surface of a disk-shaped placement base having the predetermined diameter so that the adjacent bread pieces partially overlap one another; placing a circular slipping sheet having substantially the same diameter as the predetermined diameter onto top surfaces of the bread pieces so that the center of the slipping sheet is located above the center of the placement base in the vertical direction; placing a pressing plate provided with a circular cutting die blade having substantially the same inner diameter as the predetermined diameter onto the slipping sheet so that the center of the cutting die blade is located above the center of the placement base in the vertical direction; rotating the pressing plate and the cutting die blade while pressing the pressing plate and the cutting die blade from the upside and cutting the bread exceeding from the placement base by the cutting die blade so as to shape the bread pieces into a circular shape having the predetermined diameter; and rotating the pressing plate while pressing the pressing plate from the upside so as to connect the overlap portions of the bread pieces by the pressing plate and shape the bread pieces in a thin thickness.

Advantageous Effects of the Invention

The pizza base shaping tool and the pizza base shaping method of the invention have the following effects.

According to a first inventive aspect of the invention, it is possible to make a circular and thin plate-shaped pizza base by shaping sliced bread as a food material which may be commonly obtained at home. Further, since it is possible to simply make an authentic pizza base having a crisp texture and a good-looking size by connecting a plurality of bread pieces, it is possible to simply make an authentic pizza at home.

According to second and third inventive aspects of the invention, since the pressing surface of the pressing plate of the cutting die is provided with the convex portion and the flexible slipping sheet is used, the pressing force applied to the bread may be concentrated on the convex portion, and hence the bread may be effectively compressed and easily changed into a thin plate shape. Further, since the bread may be pressed and stretched by also applying a force thereto in the substantially horizontal direction, the bread pieces of the laminated portion may be more reliably connected to one another.

According to a fourth inventive aspect of the invention, since the guide guides the cutting die to an accurate position when the placement base is covered by the cutting die, the bread may be easily and reliably shaped in a circular shape.

According to a fifth inventive aspect of the invention, since the bread may be disposed along the guide and may be disposed at an accurate position, the bread may be pressed and shaped smoothly. A large-sized pizza base may be made by reliably connecting the bread pieces. Further, the guide is used to prevent the movement of the bread while holding the end of the bread when the cutting die is rotated in a covered state.

According to a sixth inventive aspect of the invention, since it is possible to reliably prevent the movement of the bread placed on the placement base, the bread may be shaped in a pretty circular shape.

According to a seventh inventive aspect of the invention, since a pressing force may be applied to the cutting die blade from a position just thereabove, the bread may be shaped much faster in a circular shape.

According to an eighth inventive aspect of the invention, since the plurality of sliced bread pieces is shaped and the bread pieces are connected to one another at a part thereof, a large circular and thin plate-shaped pizza base may be made. It is possible to simply make an authentic pizza base having a good-looking size and having a crisp texture at home.

BRIEF DESCRIPTION OF THE DRAWINGS

FIG. 4 is a flowchart illustrating a pizza base shaping method using the pizza base shaping tool of the first embodiment.

FIG. 8 is a perspective view illustrating a rear surface of a cutting die of the pizza base shaping tool of the second embodiment.

FIG. 9 is a cross-sectional view illustrating the respective configuration of the pizza base shaping tool of the second embodiment.

DESCRIPTION OF THE EMBODIMENTS

A pizza base shaping tool and a pizza base shaping method of the invention are used to simply shape sliced bread into a substantially circular and thin plate-shaped pizza base for the real texture. Furthermore, a large-sized pizza base may be made when a plurality of bread pieces is connected to one another. Here, the terminology "large size" indicates a size which is larger than the pizza base in which one sliced bread piece may be used. In addition, the terminology "pizza base for the real texture" indicates a thin pizza base called a generally known thin-crust pizza base.

Hereinafter, the embodiments of the pizza base shaping tool and the pizza base shaping method of the invention will be described with reference to the drawings.

First Embodiment

Figure 1:
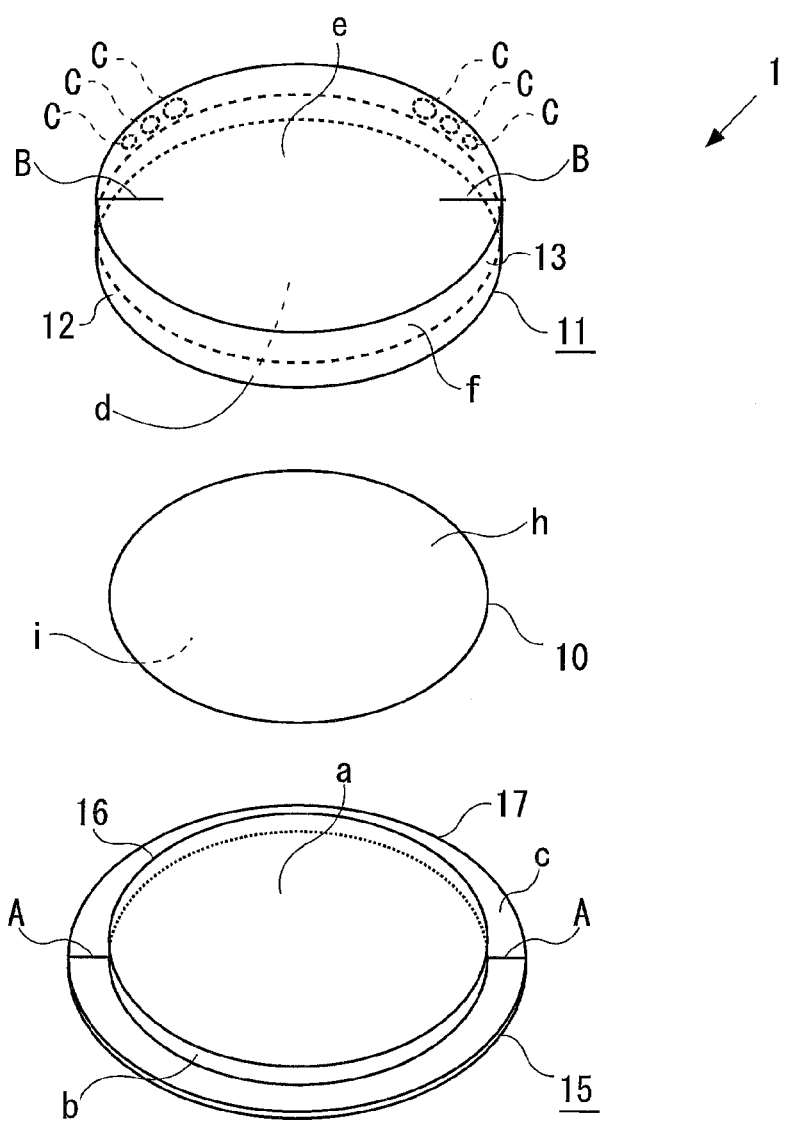
FIG. 1 is a view illustrating the respective configurations of a pizza base shaping tool of a first embodiment.
Figure 2:
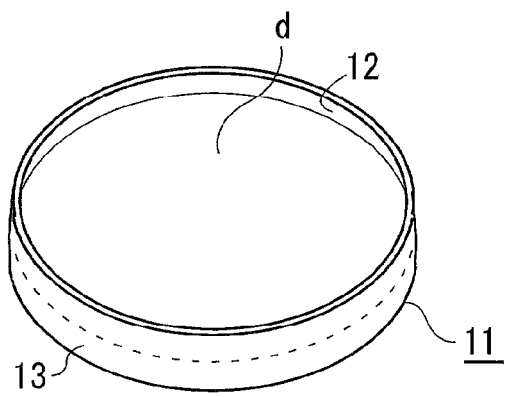
FIG. 2 is a perspective view illustrating a rear surface of a cutting die of the pizza base shaping tool of the first embodiment.
Figure 3:
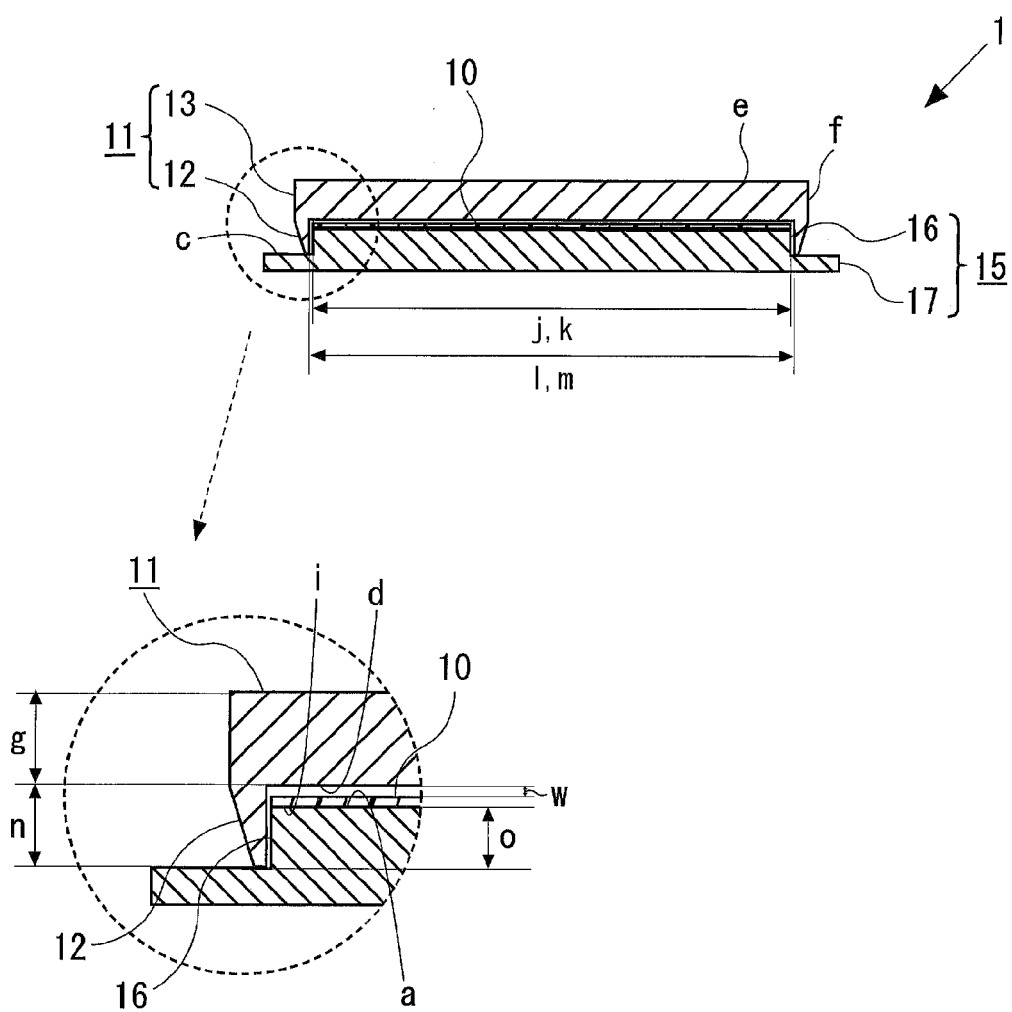
FIG. 3 is a cross-sectional view illustrating an overlap state of the pizza base shaping tool of the first embodiment.

FIG. 1 is a view illustrating the configurations of a pizza base shaping tool 1 of a first embodiment and a perspective view in which the pizza base shaping tool is obliquely viewed from the upside. FIG. 2 is a perspective view in which a rear surface of a cutting die 11 of the pizza base shaping tool 1 of FIG. 1 is obliquely viewed from the upside. Further, FIG. 3 is a schematic view illustrating an overlap state of the pizza base shaping tool 1, a cross-sectional view taken along a perpendicular plane passing through the center point of the pizza base shaping tool 1, and an enlarged view of a portion indicated by the dashed line. Hereinafter, a direction toward a die receiver 15 is set as the downside and a direction toward the cutting die 11 is set as the upside when the pizza base shaping tool 1 is used while being placed on a table or a work table.

The pizza base shaping tool 1 of the first embodiment includes the die receiver 15 with a placement base 16 on which sliced bread (hereinafter, referred to as bread) is placed and a flange 17 which is provided in the lower end of the placement base 16 in the circumferential direction, the cutting die 11 with a cutting die blade 12 which cuts out the bread and a pressing plate 13 which presses the bread, and a slipping sheet 10 which is disposed near the pressing plate 13 in the bread interposed between the placement base 16 and the pressing plate 13.

The die receiver 15 is a seat with the placement base 16 which is formed of a material such as wood, resin, and metal having rigidity and on which the bread is placed on a top surface a thereof and the flange 17 which receives and stops the front end of the cutting die blade 12 of the cutting die 11. The placement base 16 has a disk shape and is formed so that a side wall surface b is perpendicular to the top surface a. The flange 17 is formed so as to horizontally extend outward from the circumferential edge of the lower end of the placement base 16. Further, a pair of linear marks "A" is attached to the positions facing each other with the center point interposed therebetween on the top surface c of the flange 17.

The size of the friction coefficient of the top surface a of the placement base 16 is set to prevent an accident in which the bread placed on the placement base 16 spins or rotates (hereinafter, appropriately referred to as "rotates" or "turns") when the cutting die 11 is spun or rotated. That is, a surface treatment of increasing the friction coefficient is performed if necessary in accordance with the material or the surface state thereof. For example, when the material is wood which may be finished by polishing, the rotation of the bread may be prevented by the unevenness of the bread, the moisture contained in the bread, and the unevenness of the wood. Further, when the material is resin, a treatment (not illustrated) of forming a fine unevenness, a fine convex portion, a fine concave portion, or a fine groove (for example, a difference in the height between the concave portion and the convex portion and the height of the convex portion, the depth of the concave portion, or the depth of the groove of 0.01 mm to 0.50 mm) on the entirety or a part of the surface thereof in order to increase the friction coefficient so that the rotation of the bread is prevented.

Further, when the pizza base shaping tool 1 is used, there is a possibility that the die receiver 15 may slip on the table in accordance with the material of the die receiver 15 or the surface of the table on which the pizza base shaping tool 1 is placed. In order to prevent this problem, it is desirable to perform a non-slip treatment (not illustrated) on the bottom surface (the rear surface) of the die receiver 15. For example, an etching treatment, a coating treatment, or a non-slip tape attaching treatment may be exemplified.

The cutting die 11 includes the disk-shaped pressing plate 13 which is formed of a material such as wood, resin, and metal having hardness and the annular cutting die blade 12 which is formed in the circumferential edge of the bottom surface (the rear surface) d of the pressing plate 13 so as to extend downward in a direction perpendicular to the bottom surface d of the pressing plate 13. The pressing plate 13 is used to press and compress the bread in a thin plate shape, and the cutting die blade 12 is used to shape the bread in a circular shape by cutting the circumferential edge thereof. The bottom surface d as a pressing surface that presses the bread in the pressing plate 13 is flat as illustrated in FIG. 2. Furthermore, it is desirable that the outer surface of the cutting die blade 12 be inclined inward so that the thickness is thinned as it goes toward the front end thereof as illustrated in FIG. 3.

Similarly to the flange 17, a pair of linear marks "B" is attached to the positions facing each other with the center point of the cutting die 11 interposed therebetween on the circumferential edge of the top surface e of the pressing plate 13 of the cutting die 11. Three oval concave portions C are provided at the line-symmetrical positions with respect to the symmetric axes of two marks B of the cutting die 11 at the upside (the side wall of the pressing plate 13) of the side wall f of the cutting die 11. Further, these concave portions C are disposed at one side with respect to the line connecting two marks B.

In order to rotate the cutting die 11, fingers are added to the concave portion C of the side wall f while the top surface e is held by palms of both hands. Accordingly, it is possible to prevent the slip of the fingers due to the concave portion C. Furthermore, it is desirable to set the position of the concave portion C or the height g (see FIG. 3) of the upside (the side wall of the pressing plate 13) of the side wall f of the cutting die 11 so that the fingers placed on the concave portion C to rotate the cutting die 11 do not disturb the rotation while colliding with the bread protruding from the placement base 16.

The slipping sheet 10 is a circular member that is disposed between the cutting die 11 and the bread. The slipping sheet 10 includes a top surface h (a surface contacting the bottom surface d of the pressing plate 13 of the cutting die 11) which easily slips due to the small friction coefficient. A coating treatment such as a fluorine resin treatment may be performed. Further, it is desirable to form a bottom surface i (a surface contacting the bread) as a smooth surface so that the bottom surface comes into close contact with the bread by the moisture or the like contained in the bread and does not damage the surface of the bread. The slipping sheet 10 is formed of, for example, a sheet-shaped material made of resin such as acrylic and ABS or metal such as aluminum having hardness or a sheet-shaped material made of resin such as polypropylene (PP), polyvinyl chloride (PVC), and polyethylene (PE), paper, and cloth having flexibility.

Here, when the cutting die 11 is rotated while being pressed downward in a state where the bottom surface d of the pressing plate 13 of the cutting die 11 directly contacts the top surface of the bread placed on the placement base 16 without using the slipping sheet 10, the top surface of the bread is damaged due to the friction or a position shift occurs in the overlapping bread pieces. As a result, it is difficult to connect (combine) the bread pieces. Further, there is a case in which only the overlap portion of the bread is twisted so that the bread is torn off.

In the invention, the above-described slipping sheet 10 is disposed between the bread and the pressing plate 13 of the cutting die 11 in order to solve this problem. When the friction coefficient of the top surface h of the slipping sheet 10 is decreased and the pressing plate 13 is spilled on the slipping sheet 10 without substantially rotating the slipping sheet 10 contacting the bread, only the cutting die 11 may be rotated. Accordingly, it is possible to prevent the damage or the position shift of the bread, and hence to shape the bread into a thin-plate-shaped pizza base.

Next, the relation of the respective members will be described. As illustrated in FIG. 3, the cutting die 11 may be disposed so as to cover the placement base 16 of the die receiver 15 from the upside thereof while the slipping sheet 10 is disposed therebetween. Further, the bread (not illustrated) is shaped while being interposed between the slipping sheet 10 and the placement base 16. Specifically, the diameter j of the placement base 16 is equal to the diameter of the pizza base to be made. The diameter k of the slipping sheet 10 is substantially equal to the diameter j of the placement base 16, and may be slightly small so that the slipping sheet does not rotate when the cutting die 11 is rotated. Further, the diameter l of the bottom surface d of the pressing plate 13 of the cutting die 11 is slightly larger than the diameter j of the placement base 16 (for example, by 2 mm to 4 mm), and is equal to the inner diameter m of the cutting die blade 12. With such a size, the cutting die 11 may be easily rotated when the cutting die 11 covers the placement base. The length n of the cutting die blade 12 which protrudes downward from the bottom surface d of the pressing plate 13 is slightly longer than the thickness (the height) o of the placement base 16. Although the thickness of the placed bread is concerned, it is desirable that the gap w between the bottom surface d of the pressing plate 13 and the top surface of the slipping sheet 10 placed on the top surface a of the placement base 16 when the front end of the cutting die blade 12 reaches the top surface c of the flange 17 while the bread is not placed thereon do not exist or a gap of 3 mm or less. In this way, when the gap between the bottom surface i of the slipping sheet 10 and the top surface a of the placement base 16 is narrowed, the bread which is interposed therebetween is shaped in a thin plate shape, and hence a pizza base which gives the taste of the real crisp thin-crust pizza may be obtained.

Figure 5A:
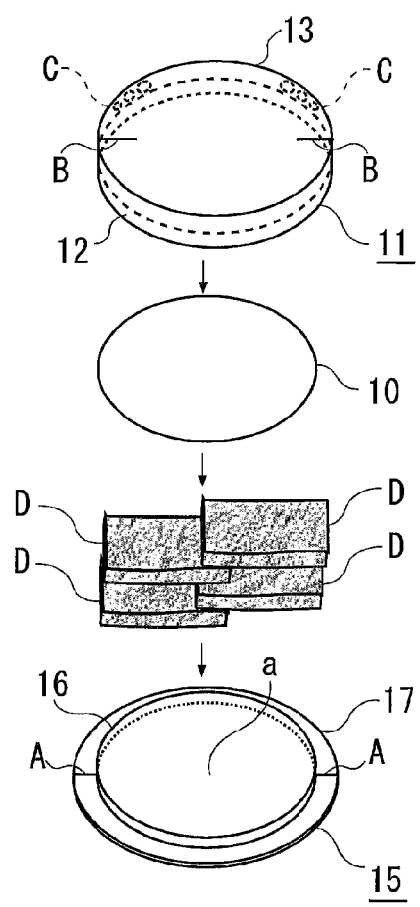
FIG. 5A is a perspective view illustrating the pizza base shaping method using the pizza base shaping tool of the first embodiment, in which the overlap sequence is shown.
Figure 5B:
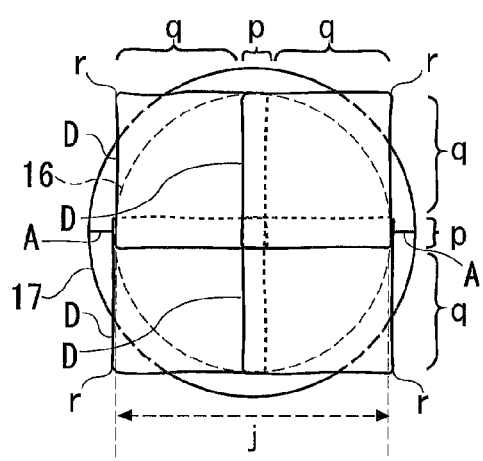
FIG. 5B is a top view illustrating the pizza base shaping method using the pizza base shaping tool of the first embodiment, showing a state where four bread pieces are placed on the placement base.
Figure 5C:
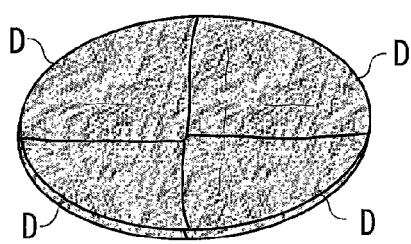
FIG. 5C is a perspective view illustrating the pizza base shaping method using the pizza base shaping tool of the first embodiment, showing a state where the pizza base obtained by shaping four bread pieces.

Next, a pizza base shaping method using the pizza base shaping tool 1 of the first embodiment will be described. FIG. 4 is a flowchart illustrating the pizza base shaping method using the pizza base shaping tool 1. FIGS. 5A to 5C are views illustrating the pizza base shaping method, where FIG. 5A is a perspective view in which the overlap sequence is viewed from the oblique front upside, FIG. 5B is a top view illustrating a state where four bread pieces D are placed on the placement base 16, and FIG. 5C is a perspective view illustrating a state where the pizza base obtained by shaping four bread pieces D is viewed from the oblique front upside.

As illustrated in FIG. 5A, the die receiver 15 is first placed on the table so that the marks A of the flange 17 of the die receiver 15 are located at the left and right positions (positions substantially parallel to the line connecting both shoulders of the user of the pizza base shaping tool 1). Then, the bread is placed on the top surface a of the placement base 16 so that the marks A of the flange 17 are not hidden (S1).

Subsequently, the slipping sheet 10 is placed on the top surfaces of the bread pieces D so that the center is located above the center of the placement base 16 in the perpendicular direction (S2). Then, the cutting die 11 is placed on the slipping sheet 10 so that the marks B of the cutting die 11 and the marks A of the flange 17 are located on the same line, that is, the center of the cutting die 11 is located above the center of the placement base 16 in the perpendicular direction (S3). Then, when the cutting die 11 is rotated while being pressed by the palms of both hands from the upside in a state where the fingertips are hooked to the concave portions C, the bread pieces D are compressed by the pressing plate 13, and the portion protruding from the placement base 16 is cut in a manner such that the inner wall of the cutting die blade 12 of the cutting die 11 contacts the outer circumferential edge of the top surface a of the placement base 16 or the front end of the cutting die blade 12 of the cutting die 11 contacts the top surface c of the flange 17. Then, when the cutting die is rotated while being further pressed, a pizza base is shaped in a thin flat shape (S4).

Here, in order to shape a large-sized pizza base having a substantially circular shape, the die receiver 15 is first placed on the table so that the marks A of the flange 17 of the die receiver 15 are located at the left and right positions (positions substantially parallel to the line connecting both shoulders of the user of the pizza base shaping tool 1). As illustrated in FIG. 5B, the square bread pieces D, for example, four square sliced bread pieces D obtained by removing the crusts thereof are placed on the top surface a of the placement base 16 so that two bread pieces are lined up in the vertical and horizontal directions and the side ends of the facing edges of two adjacent bread pieces D overlap each other (hereinafter, the overlap portion will be referred to as the laminated portion p, and the other single portion will be referred to as the single layer portion q). At this time, the bread pieces are placed thereon so that the length of four bread pieces D overlapping in the horizontal (left and right) direction is substantially equal to the diameter j of the placement base 16 and the marks A of the flange 17 are not hidden by the bread pieces D.

Subsequently, the slipping sheet 10 is placed on the top surfaces of four bread pieces D which partially overlap one another (at the connected side ends). At this time, a center portion which is obtained by overlapping four bread pieces may be slightly pressed from the upside. Next, the cutting die 11 covers the flange 17 so that the marks B of the cutting die 11 match the marks A of the flange 17 on one line. Then, when the cutting die 11 is rotated while being pressed by the palms of both hands in a state where the fingertips are hooked to the concave portions C, the bread pieces D are pressed by the pressing plate 13 so as to be shaped in a flat shape, and the cutting die blade 12 cuts portions (hereinafter, referred to as the protrusion portions r) protruding from the placement base 16 in the four bread pieces D overlapping one another. Further, when the cutting die 11 is rotated while being pressed, a large-sized pizza base having a substantially circular and thin plate shape is shaped as illustrated in FIG. 5C. Further, the laminated portions p of the bread pieces D are not simply peeled off since the unevenness portions of the surfaces are connected so as to be interlaced by the pressing and rotating operations.

The cutting die 11 may be spun in one direction, but may be desirably rotated. For example, as the rotation method, the cutting die 11 is spun by 90° while being pressed, and is returned to the original position while being pressed. Next, the cutting die is spun by 90° in the reverse direction in the same way, and is returned to the original position. When the spinning operation is repeated two or three times, the protrusion portions r of the bread pieces are removed. Further, the bread pieces D are formed in a circular shape in which the protrusion portions r of the bread pieces are completely cut by repeating the spinning operation two or three times, and the bread pieces D are compressed so as to be shaped in a flat shape. Further, a configuration may be employed in which the spinning operation is performed several times by further decreasing the spin angle, the pizza base shaping tool 1 is rotated along with the placed bread pieces D (for example, by 90°) and is placed on the table, and the spinning operation is performed several times by adjusting the positions of the concave portions C of the cutting die 11 so that the entirety is pressed evenly.

The size of the pizza base to be shaped is dependent on the size of the diameter j of the placement base 16, but is, for example, 170 mm to 210 mm. That is, the size is set so that the pizza base may enter a large-sized oven toaster. Since the length of one edge of the bread obtained by removing the crust of the square sliced bread is about 110 mm to 115 mm in the vertical direction and is about 95 mm to 115 mm, four bread pieces may be used. Two pizza bases may be accurately made as a loaf from eight sliced bread pieces. When the bread pieces D overlap one another so that the lengths in the vertical and horizontal directions (the four directions) are substantially equal to the diameter j of the placement base 16 as described above, a portion (a portion which does not become the pizza base) which is cut by the cutting die blade 12 may be small.

It is desirable that the thickness of one bread piece D be 15 to 20 mm. For example, this thickness corresponds to the thickness of six or eight sliced bread pieces. Although the size of the gap w (see FIG. 3) is concerned, there is a case in which the texture of the sliced bread is left in that the sliced bread is not sufficient pressed when the sliced bread is too thin. Further, there is a case in which the textures for the laminated portion p and the single layer portion q are different when the sliced bread is too thick. Furthermore, the same texture may be obtained in the entire part by further overlapping another bread piece on the single layer portion q.

As illustrated in FIG. 5A, a method of placing the bread pieces D is not limited to the sequence of the left lower position, the right lower position, the left upper position, and the right upper position, and may be set as the clockwise sequence of the right upper position, the right lower position, the left lower position, and the left upper position. Further, a configuration may be employed in which one bread piece D is cut along the diagonal line into two triangular bread pieces and the triangular bread pieces are radially disposed so as to slightly overlap one another while the most acute portion is set as the center. Further, in the case of the mountain-shaped sliced bread larger than the rectangular sliced bread, two or three sliced bread pieces may be shaped in a circular shape.

The bread piece D to be used is not limited to the rectangular or mountain-shaped sliced bread piece as long as the sliced shapes may partially overlap one another. For example, brioche or croissant and the like may be sliced. When the size is small, the sliced bread pieces may be connected to one another without forming a hole therebetween by increasing the number of the sliced bread pieces. Further, when the thickness is thin, the sliced bread pieces may have an appropriate thickness by overlapping several bread pieces D.

According to the pizza base shaping tool 1 of the first embodiment, it is possible to shape the bread pieces D into a flat shape by simply and fast compressing the bread pieces. When the bread pieces D are crushed thinly so as to extrude the air contained therein, the particular texture of the bread may disappear. Thus, when the bread pieces are baked, the real crisp texture of the pizza may be obtained. Particularly, since the placement base 16 with the top surface a having a large friction coefficient and the slipping sheet 10 with the top surface h having a small friction coefficient are provided, it is possible to prevent the rotation of the bread pieces D when the cutting die 11 is rotated, and hence to shape one pizza base having a circular and thin plate shape by pressing the bread pieces D without tearing the bread pieces. Further, when the diameter j of the top surface a of the placement base 16 is large, it is possible to make a good-looking large-sized pizza base by connecting a plurality of bread pieces D.

As described above, the marks A and the marks B are respectively attached to the flange 17 and the cutting die 11. Even when most of the circumferential edge of the placement base 16 is not visible by placing the bread pieces D (see FIG. 5B), the cutting die blade 12 of the cutting die 11 may be positioned to the circumferential edge of the placement base 16 by matching the marks A of the flange 17 to the marks B of the cutting die 11. Further, since the flange 17 is provided, the top surface c of the flange 17 receives the front end of the cutting die blade 12 of the cutting die 11, and hence the table is not damaged. Furthermore, since the protrusion portions r of the bread pieces D is cut not only the pressing operation, but also the rotation of the circular cutting die blade 12, the front end of the cutting die blade 12 does not need to be sharp, and hence the pizza base shaping tool 1 may be used even by a small kid.

Since the bread pieces D may be made as various types such that the bread piece has a different combination of fresh cream, butter, and eggs or the bread piece is obtained by adding grapes, walnut, rye, or brown rice, it is possible to make various pizza bases having different tastes and textures by using these materials. Since the arrangement option is widened in that the bread piece may be used not only for a pizza for meals, but also for cakes, a child and an adult may enjoy the making of the pizza. Further, since the pizza base shaping tool 1 of the first embodiment has a simple configuration, the pizza base shaping tool may be manufactured at low cost by suppressing an increase in cost.

The shapes, the sizes, the configurations, and the like of the respective members of the pizza base shaping tool 1 are not limited to the above-described embodiment, and may be modified into various forms without departing from the spirit of the embodiment. For example, in the embodiment, the pressing plate 13 is formed in a disk shape, but the embodiment is not limited to the shape. That is, an oval or rectangular pressing plate may be used as long as a pressing surface for pressing the bread piece D is provided and the annular cutting die blade 12 is provided so as to protrude in a direction perpendicular to the pressing surface. Further, the shape of the bottom surface d of the pressing plate 13 is not limited to the flat plate shape as long as the bread piece D may be formed in a flat shape while the cutting die 11 is pressed and rotated, and may be formed in a wavy shape or an uneven shape. For example, the pressing plate 13 may have an opening. Further, a part or the entirety of the pressing plate 13 and the slipping sheet 10 may be formed in a transparent state, so that the state of the pressed bread piece D is visible.

The cutting die 11 is integrally formed by extending the cutting die blade 12 from the pressing plate 13, but the invention is not limited to such a configuration. For example, the cutting die blade 12 may be formed separately from the pressing plate 13. For example, a configuration may be employed in which the pressing plate 13 and the cutting die blade 12 are provided as separate members and the pressing plate 13 includes a plurality of pressing surfaces so that both surfaces thereof may be used as press portions. The locking positions corresponding to the thickness of the bread piece D as the material may be selected by changing the surfaces to be used or the pressing plate 13 having various thickness corresponding to the thickness of the bread piece D may be provided so as to be replaceable. However, in the case of the integral forming operation, the manufacturing cost for the product obtained by the separate forming operation may be decreased.

The material of the slipping sheet 10 is not limited to the above-described example as long as the slipping sheet is disposed between the bread piece D and the cutting die 11 and may prevent the rotation of the bread piece D when the cutting die 11 is pressed and rotated. Further, the slipping sheet may be integrated with the pressing plate 13 although not illustrated in the drawings. The shapes or the positions of the marks A and B and the shape of the concave portion C are not limited to those of the above-described embodiment.

Second Embodiment

Figure 6:
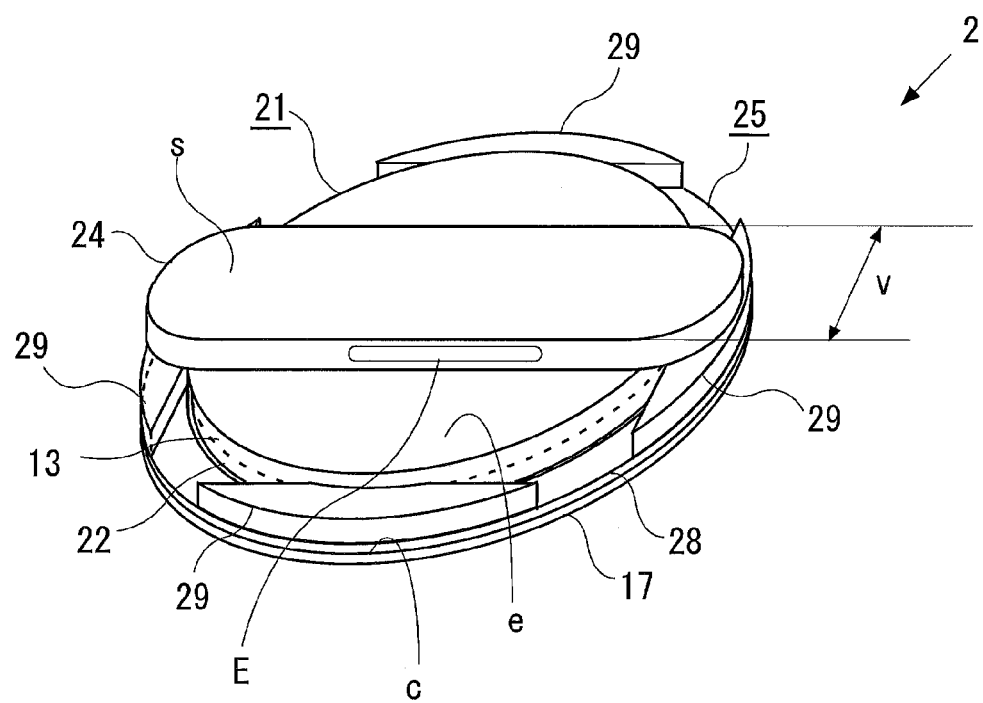
FIG. 6 is a schematic view illustrating a pizza base shaping tool of a second embodiment.
Figure 7:
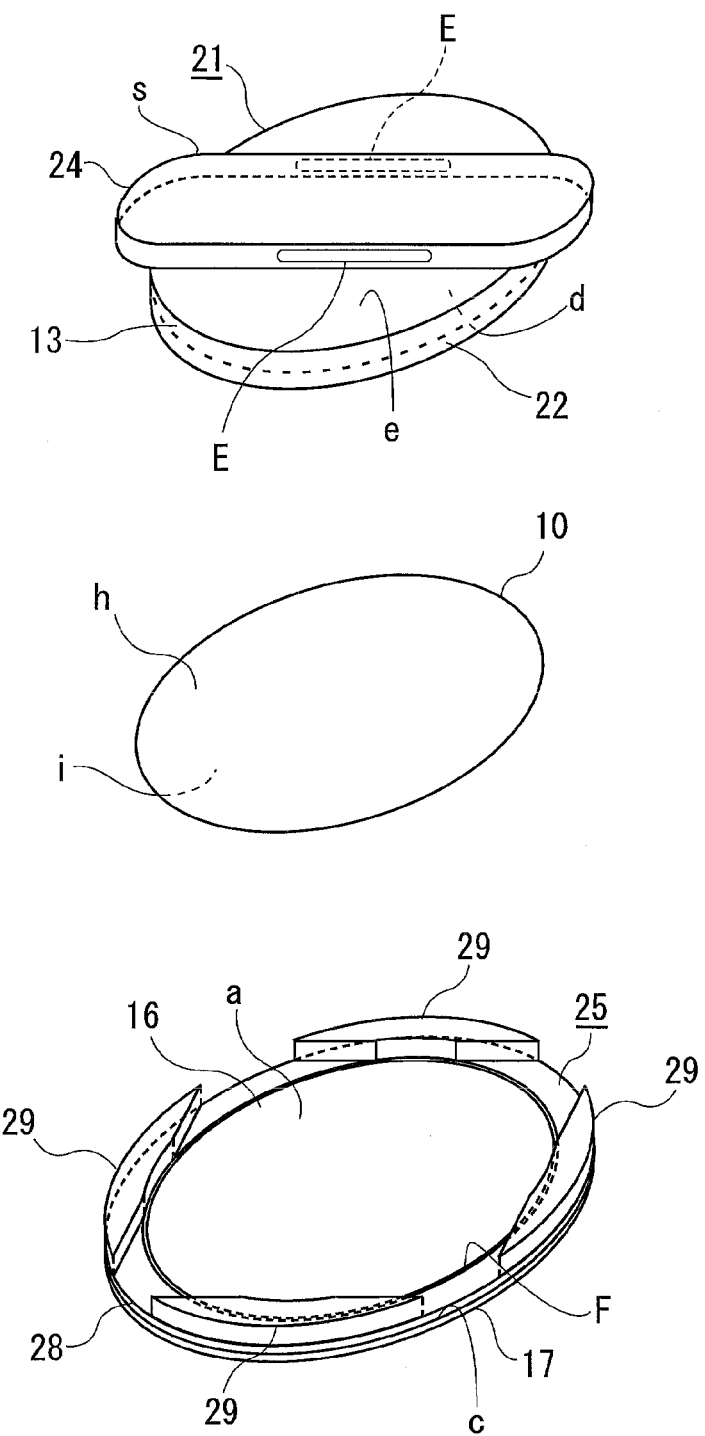
FIG. 7 is a view illustrating the respective configurations of the pizza base shaping tool of the second embodiment.
Figure 10:
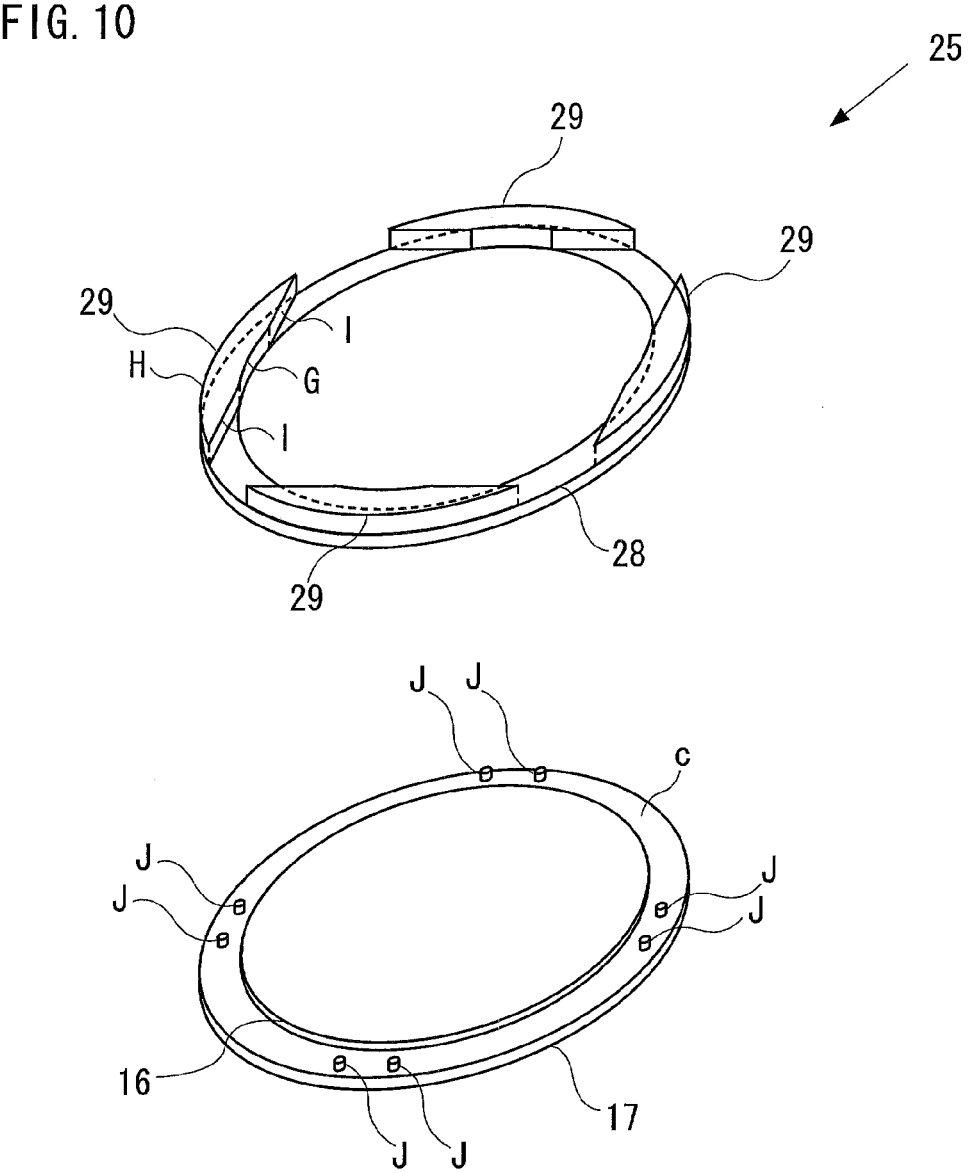
FIG. 10 is a view illustrating the configurations of a die receiver of the pizza base shaping tool of the second embodiment.
Figure 11A:
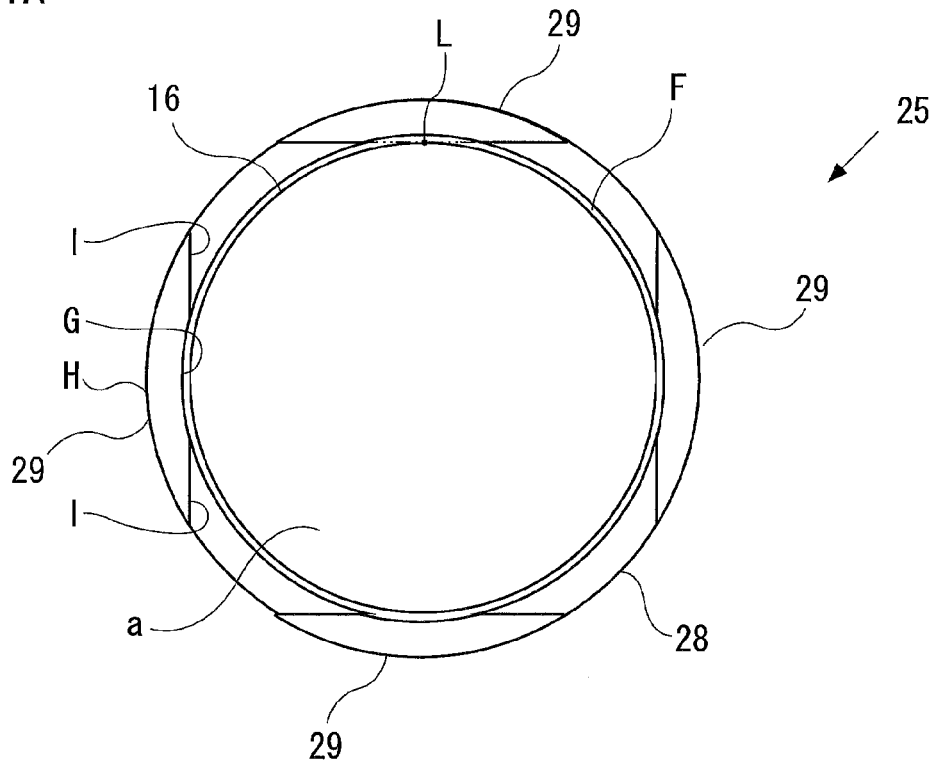
FIG. 11A is a top view illustrating the configuration of the die receiver of the pizza base shaping tool of the second embodiment.
Figure 11B:
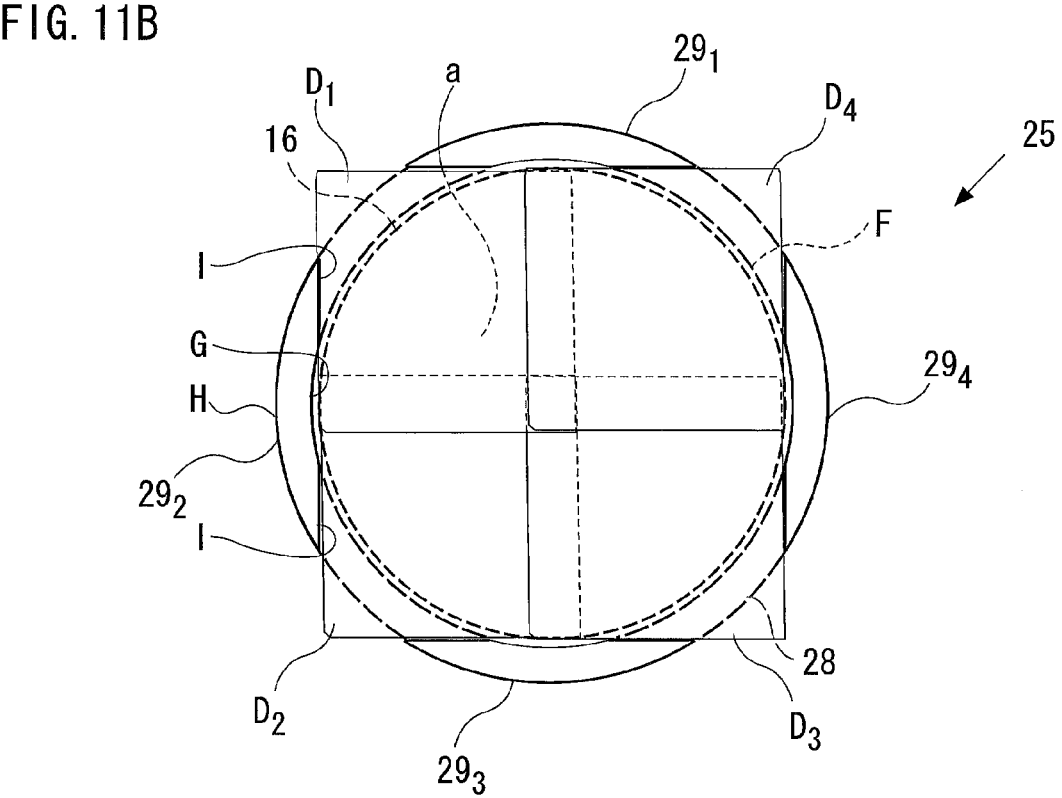
FIG. 11B is a top view illustrating a state where the bread pieces are disposed on the die receiver of the pizza base shaping tool of the second embodiment.

Next, a pizza base shaping tool 2 of a second embodiment will be described. FIG. 6 is a schematic view illustrating a state where the pizza base shaping tool 2 of the second embodiment is viewed from the oblique right upside, FIG. 7 is a view illustrating a state where the respective components of the pizza base shaping tool 2 of the second embodiment are viewed from the oblique right upside, and FIG. 8 is a perspective view illustrating a state where the rear surface of the cutting die 21 of the pizza base shaping tool 2 of FIG. 7 is viewed from the oblique right upside. FIG. 9 is a cross-sectional view illustrating the respective configurations of the pizza base shaping tool 2 when taken along the perpendicular plane at the center thereof in a direction parallel to the longitudinal direction a handle 24. FIG. 10 is a view illustrating the configuration of a die receiver 25 and is a perspective view illustrating a state where the configurations are viewed from the oblique right upside. FIGS. 11A and 11B are views illustrating the die receiver 25 of the pizza base shaping tool 2, where FIG. 11A is a top view illustrating the configuration of the die receiver 25 and FIG. 11B is a top view illustrating a state where the bread pieces D are disposed on the die receiver 25.

As illustrated in FIGS. 6 to 11, the cutting die 21 and the die receiver 25 of the pizza base shaping tool 2 are different from the cutting die 11 and the die receiver 15 of the pizza base shaping tool 1. Hereinafter, a component having the same shape and configuration as the pizza base shaping tool 1 is indicated by the same reference sign. Here, the repetitive description thereof will be omitted and only the difference thereof will be described.

As illustrated in FIGS. 6 to 9, the cutting die 21 of the pizza base shaping tool 2 is provided with the handle 24 for rotating the cutting die 21 instead of forming the concave portion C in the side wall surface f of the cutting die 11. The handle 24 is formed in a columnar shape of which the horizontal cross-section is a rectangular shape having a round corner, and is fixed to the top surface e of the pressing plate 13 so that the center of the pressing plate 13 and the center of the handle 24 exist on the extension line. As illustrated in FIG. 9, the length t of the top surface s of the handle 24 in the length direction is substantially equal to the outer diameter u of the flange 17, and is longer than the diameter of the top surface e of the pressing plate 13. Then, the handle 24 protrudes outward from the circumferential edge of the top surface e of the pressing plate 13.

With such a shape, since a portion direct above a part of the cutting die blade 22 disposed on the circumferential edge of the pressing plate 13 may be pressed downward by the palms and the gap of the palms of the pizza base shaping tool 1 may be substantially widened to the shoulder width, a force may be easily applied thereto. Furthermore, since there is no need to provide the concave portion C in the side wall surface of the cutting die 21, the height (the thickness of the pressing plate 13) of the side wall of the pressing plate 13 may be lower than that of the first embodiment.

As illustrated in FIGS. 6 and 7, substantially rectangular recesses E to which the fingertips are hooked are provided in the side walls parallel to the longitudinal direction of the handle 24 so as to face each other, and hence the cutting die 21 may be easily moved by one hand. Further, since the handle 24 is formed in a shape which does not protrude toward the outside of the flange 17, the handle does not occupy any place when the pizza base shaping tool 2 is accommodated, and the handle may be accommodated with a slight gap therebetween. Further, since the top surface s of the handle 24 is flat as illustrated in FIG. 9 and the like, the cutting die 21 may be disposed stably without reversing and dropping the cutting die 21 so that the front end of the cutting die blade 22 faces the upside. Further, the bottom surface d of the pressing plate 13 of the cutting die 21 is flat similarly to the first embodiment.

As illustrated in FIG. 6, the length v of the top surface s of the handle 24 in the width direction is a length in which a thumb contacts one side wall parallel to the longitudinal direction and the other thumb contacts the other side wall when the top surface s of the handle 24 may be pressed by the palms (the base of the thumb may be placed on the top surface s of the handle 24) and the handle 24 is moved by one hand. For example, the length is 40 mm to 80 mm. The thickness of the handle 24 is a thickness in which the side wall of the handle 24 may be held by the fingertip as described above, and is a thickness in which the force applied to rotate the cutting die 21 may be endured. Although the thickness is different depending on the material, the thickness is, for example, 10 mm to 20 mm. With such a size, since the handle may be easily pressed or gripped and the round corner of the handle 24 may be pressed so as to be surrounded along the concave portion (the portion below the finger) of the palm, the cutting die 21 may be easily rotated.

As illustrated in FIGS. 6 to 7 and FIGS. 9 to 11, the die receiver 25 of the pizza base shaping tool 2 has a configuration in which an outer frame 28 and a guide 29 are provided in the die receiver 15 of the first embodiment. As illustrated in FIG. 10, the outer frame 28 and the guide 29 are integrally formed with each other, and are formed separately from the placement base 16 and the flange 17. The bottom surface of the outer frame 28 is provided with a columnar concave portion (not illustrated), and the columnar concave portion is detachably locked to a small columnar protrusion portion J provided in the flange 17 so as to protrude upward. The die receiver is used in the assembled state, and is separated from each other after the use thereof, so that a groove F (see FIG. 9) may be easily cleaned.

The outer frame 28 is formed in a flat circular ring shape. As illustrated in FIG. 9, the diameter x of the inner circumference is slightly larger than the outer diameter y of the cutting die blade 22 (for example, by 1 mm to 4 mm), and the diameter z of the outer circumference is substantially equal to the outer diameter u of the flange 17. When the outer frame 28 is attached to the top surface c of the flange 17, the groove F is formed between the placement base 16 and the outer frame 28. Then, when the front end of the cutting die blade 22 is inserted into the groove F while being rotated, the protrusion portions r of the bread pieces may be cut fast. Further, since the thickness $A_1$ of the outer frame 28 is substantially equal to the thickness $A_2$ of the placement base 16 so that a flat surface is formed, the bread pieces D placed on the placement base 16 is not easily shifted. Furthermore, it is desirable to form the front end of the cutting die blade 22 of the pizza base shaping tool 2 so that the outer surface is inclined inward and the inner surface is inclined outward so as to decrease the thickness as it goes toward the front end thereof. However, since the bread piece D is soft, the front end thereof does not need to be sharp.

As illustrated in FIGS. 10 and 11, four guides 29 ($29_1$, $29_2$, $29_3$, and $29_4$) are attached to the outer frame 28 at the same interval so as to protrude upward from the upper surface thereof. Each guide 29 is formed in a columnar shape of which the horizontal cross-section has a substantially C-shape, the inner curve G having a substantially C-shape is formed as a circular arc having the same curvature as the inner circumference of the outer frame 28, and the outer curve H having a substantially C-shape is formed as a circular arc having the same curvature as the outer circumference of the outer frame 28. Further, both ends of the inner curve G and both ends of the outer curve H exist on the same line, and the line contacts the outer circle of the top surface a of the placement base 16 at the center point L (see FIG. 11 (a)). Further, the thickness $A_3$ (see FIG. 9) of the guide 29 becomes a thickness in which the guide does not contact the handle 24 which protrudes outward from the top surface e of the pressing plate 13.

When the guide 29 with such a shape is attached to the outer frame 28 (the flange 17), the following effect is obtained.

As illustrated in FIG. 11B, when the pressed bread pieces D are placed on the top surface a of the placement base 16, the groove F of the top surface of the die receiver 25 is hidden. For this reason, it is difficult to distinguish the covering position of the cutting die 21. In the pizza base shaping tool 1 of the first embodiment, the positioning is performed by matching the marks A and B attached to the flange 17 and the cutting die 11. However, since there is a shift in four directions, there is a need to carefully perform the positioning. However, in the pizza base shaping tool 2 of the embodiment, the top surface of the outer frame 28 is provided with four guides 29 ($29_1$, $29_2$, $29_3$, and $29_4$) which protrude upward as illustrated in FIGS. 10 and 11(a). When the outer circumferential wall of the cutting die blade 22 is aligned to the inner walls of four guides 29, that is, the cutting die 21 is inserted into four guides 29, the cutting die 21 may be disposed so that the front end of the cutting die blade 22 is simply inserted into the groove F. Furthermore, even when the slipping sheet 10 is placed on the bread pieces D overlapping one another on the placement base 16, the positioning may be easily performed by the four guides 29.

Further, as illustrated in FIG. 11A, two plane side walls I of the guides 29 correspond to the tangential line with respect to the outer circumference of the top surface a of the placement base 16. Further, since four guides 29 are provided in the outer frame 28 (the flange 17) at the same interval, eight (four pairs of) side walls I (the tangential lines) are located at the positions which accurately surround the placement base 16 in a square shape. Thus, the bread pieces D are placed so that the edges of the bread pieces D contact the side walls I of two adjacent guides 29 as illustrated in FIG. 11B. Specifically, the bread piece $D_1$ may be placed so as to contact the guides $29_1$ and $29_2$, the bread piece $D_2$ may be placed so as to contact the guides $29_2$ and $29_3$, the bread piece $D_3$ may be placed so as to contact the guides $29_3$ and $29_4$, and the bread piece $D_4$ may be placed so as to contact the guides $29_4$ and $29_1$. Due to the guides 29, the positions where the bread pieces D are placed may be easily determined, and hence the positions where the bread pieces D are placed may be accurately determined. Further, when a plurality of bread pieces D is combined with one another, it is difficult to combine the bread pieces with one another when the overlap portion of the side end of the combination target bread piece is shallow. However, since the top surface of the outer frame 28 (the flange 17) is provided with four protruding guides 29, the amount of the laminated portions p may be increased by decreasing the amount of the protrusion portions r. Further, since the protruding guides 29 support the edges of the bread pieces D when the cutting die 21 is spun, the guides also have a function of preventing the movement of the bread pieces D, and hence the bread pieces D may be more reliably combined with one another.

Figure 12:
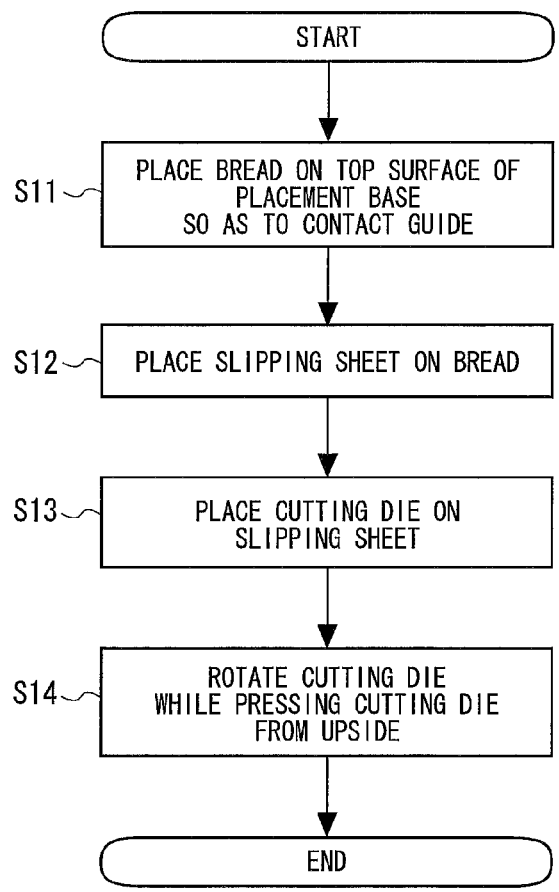
FIG. 12 is a flowchart illustrating a pizza base shaping method using the pizza base shaping tool of the second embodiment.
Figure 13:
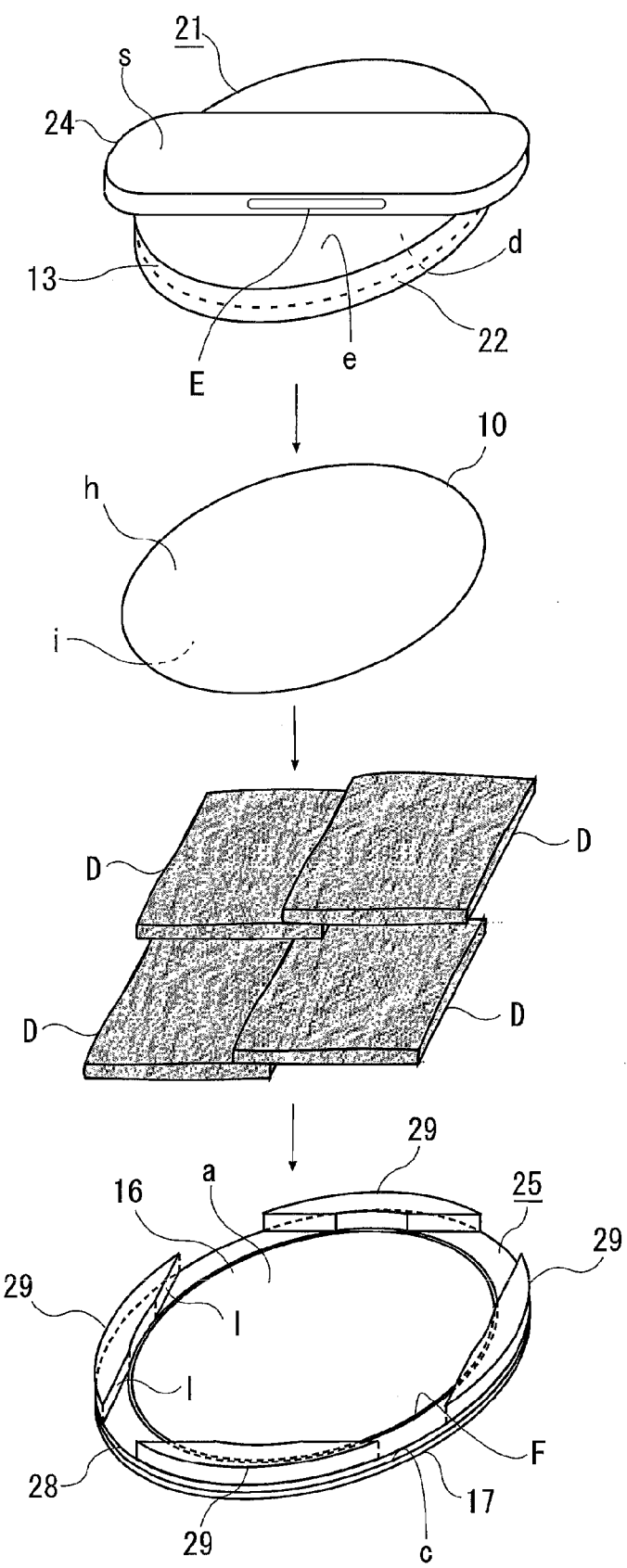
FIG. 13 is a view illustrating the pizza base shaping method using the pizza base shaping tool of the second embodiment.
Figure 14A:
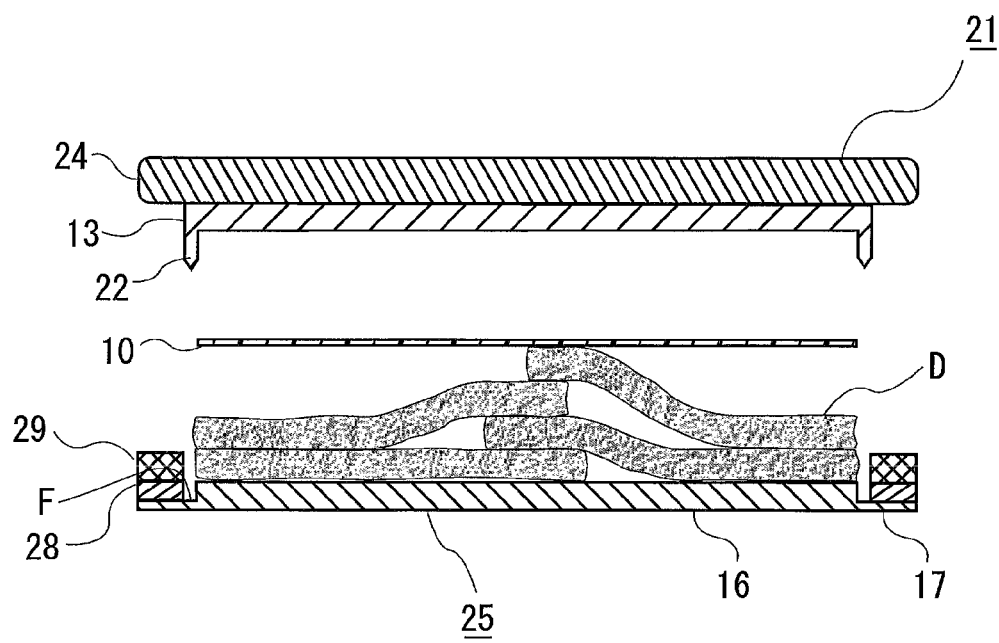
FIG. 14A is a cross-sectional view illustrating the pizza base shaping method using the pizza base shaping tool of the second embodiment, showing a state where four bread pieces are placed on the placement base.
Figure 14B:
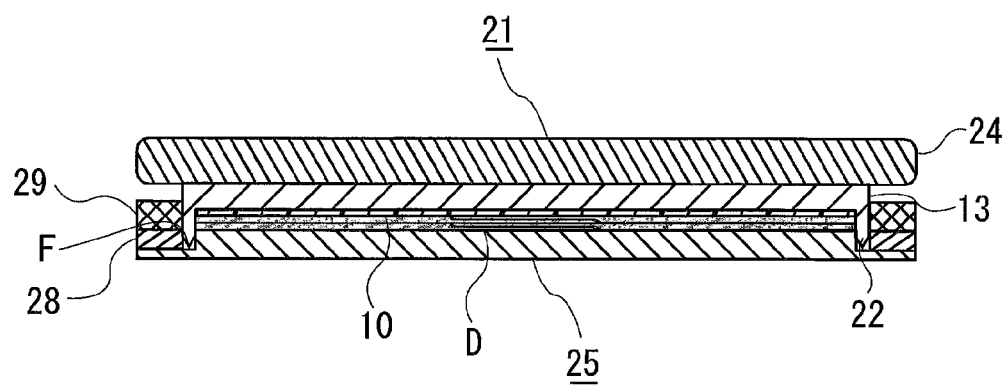
FIG. 14B is a cross-sectional view illustrating the pizza base shaping method using the pizza base shaping tool of the second embodiment, showing a state where four bread pieces are shaped by the cutting die.

Next, a pizza base shaping method using the pizza base shaping tool 2 of the second embodiment will be described. FIG. 12 is a flowchart illustrating the pizza base shaping method using the pizza base shaping tool 2. FIG. 13 is a view illustrating the pizza base shaping method using the pizza base shaping tool 2 and is a perspective view illustrating a state where the overlapping sequence is viewed from the oblique right upside. FIGS. 14A and 14B are cross-sectional views illustrating the pizza base shaping method using the pizza base shaping tool 2 when taken along the perpendicular plane parallel to the longitudinal direction of the handle 24 at the center point of the pizza base shaping tool 2, where FIG. 14A is a view illustrating a state where four bread pieces D are placed on the placement base 16 and FIG. 14B is a view illustrating a state where four bread pieces D are shaped by the cutting die 21.

As illustrated in FIGS. 12 and 13, the die receiver 25 in which the outer frame 28 and the guides 29 are attached to the flange 17 is placed on the table or the like. Then, four bread pieces D are sequentially placed so that the edges of the bread pieces D respectively contact the side walls I of two adjacent guides 29 (S11) (see FIGS. 11A and 11B, and the like). In this way, since the bread pieces D are placed along the guides 29, the laminated portion p necessary for the combination is formed. Subsequently, the slipping sheet 10 is placed on the position (see FIG. 11A) which correspond to the top surfaces of the overlapping bread pieces D and the inside of four guides 29 (S12) (see FIG. 14A). At this time, a center portion in which four bread pieces D overlap one another may be slightly pressed from the upside.

Further, the cutting die 21 is inserted into four guides 29 (S13), and is rotated while being pressed from the upside in a state where the palms of both hands hold both ends of the handle 24 of the cutting die 21. The bread pieces D are compressed and the front end of the cutting die blade 22 reaches the bottom surface of the groove F or the inner wall of the cutting die blade 22 of the cutting die 21 contacts the outer circumferential edge of the top surface a of the placement base 16, so that the protrusion portions r of the bread pieces D are cut. Further, when the handle 24 may be moved at any position while being pressed and rotated, the bread pieces D are sufficiently compressed, and hence a large-sized pizza base having a flat shape and a circular shape is completed (see FIG. 14B) (S14). The handle 24 is picked up while the rotation thereof is stopped, the cutting die 21 is moved, the slipping sheet 10 is removed, pizza sources or fillings are placed thereon, the pizza base is separated from the placement base 16, the pizza base is baked in an oven or a toaster, and hence an authentic pizza may be made.

According to the pizza base shaping tool 2 of the second embodiment, the following effect is obtained in addition to the effect of the pizza base shaping tool 1 of the first embodiment. Since the cutting die 21 is provided with the handle 24, the cutting die 21 may be easily rotated, and hence the cutting die 21 may be moved simply by one hand. Since the die receiver 25 includes the groove F, the outer wall of the cutting die blade 22 of the cutting die 21 contacts the inner circumferential edge of the outer frame 28 or a portion located above the groove F of the bread piece D is cut by the front end of the cutting die blade 22. Accordingly, the number of the positions involving with the cutting of the bread piece D increases compared to the pizza base shaping tool 1, and hence the protrusion portions r of the bread pieces D may be more reliably cut. Since the guides 29 are provided, it is easy to distinguish the placing position for the bread piece D and the covering position for the cutting die 21. Further, it is possible to prevent a position shift of the bread piece D when the cutting die 21 is rotated. Further, since the outer frame 28 and the guide 29 are provided separately from the placement base 16 and the flange 17 and are detachably attached to the top surface of the flange 17, it is possible to simply remove the scrape of bread inserted into the groove F and hence to easily clean the tool.

Furthermore, the shapes, the sizes, the number, and the configurations of the members of the pizza base shaping tool 2 are not limited to the above-described embodiment similarly to the first embodiment. For example, the outer frame 28 and the guide 29 are provided separately from the placement base 16 and the flange 17, but the outer frame 28 or the outer frame 28 and the guide 29 may be integrally formed. That is, the circular groove F may be formed in the top surface of the disk-shaped die receiver 25 so as to be recessed, and the cutting die blade 22 may be inserted therein. Although it is difficult to clean the groove F, it is possible to suppress an increase in the manufacturing cost compared to the case where the product is manufactured by the separate forming operation. Further, the top surface of the outer frame 28 is provided with the guide 29, but a configuration may be employed in which only the guide 29 is directly provided in the flange 17 without damaging the function thereof and the groove F is provided only between the guide 29 and the placement base 16. Further, the cutting die 11 of the first embodiment may be combined with the die receiver 25. Furthermore, the gap w between the bottom surface d of the pressing plate 13 and the top surface of the slipping sheet 10 placed on the top surface of the placement base 16 is the same as that of the first embodiment.

Third Embodiment

Figure 15:
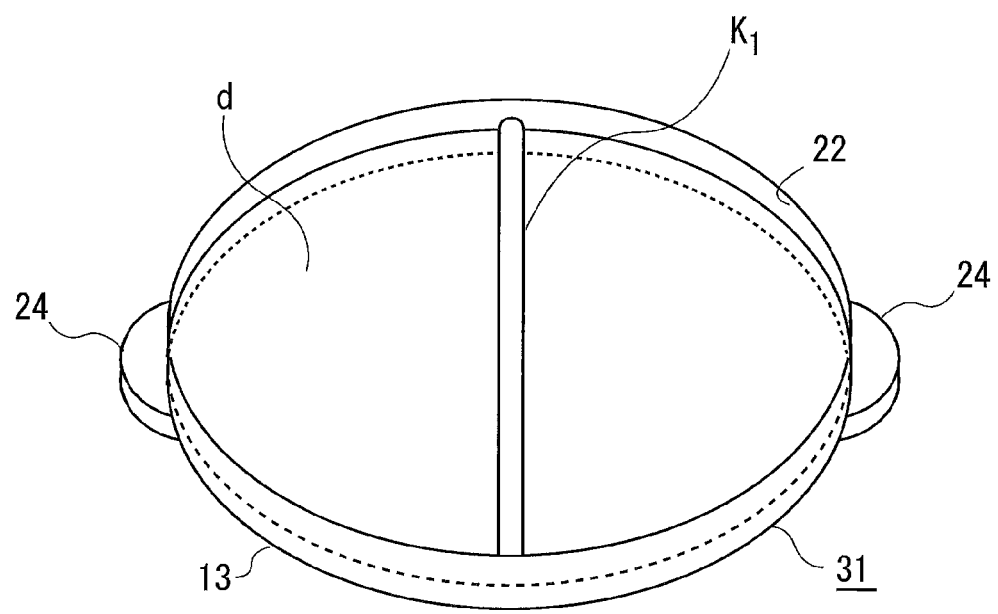
FIG. 15 is a perspective view illustrating a rear surface of a cutting die of a pizza base shaping tool of a third embodiment.
Figure 16:
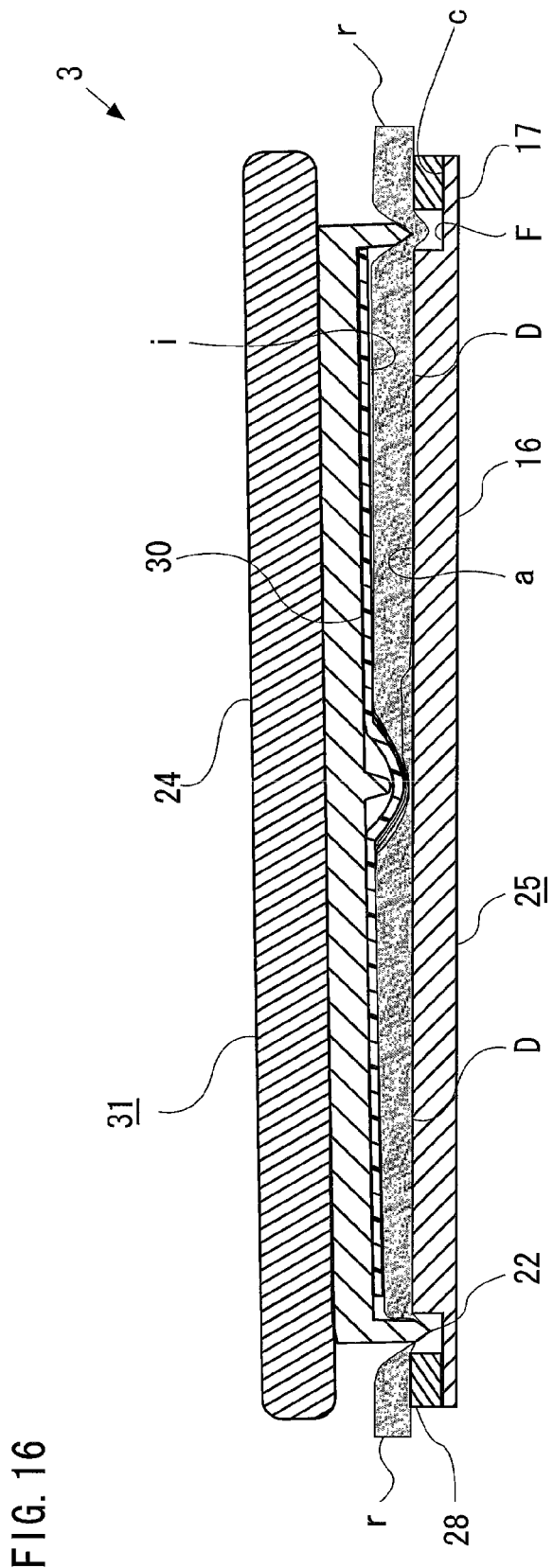
FIG. 16 is a cross-sectional view illustrating a pizza base shaping method using the pizza base shaping tool of the third embodiment.

Next, a pizza base shaping tool 3 of a third embodiment will be described. FIG. 15 is a perspective view in which a rear surface of a cutting die 31 of the pizza base shaping tool 3 is viewed from the oblique front upside. FIG. 16 is a cross-sectional view taken along the perpendicular plane parallel to the longitudinal direction of the handle 24 at the center point of the pizza base shaping tool 3. Furthermore, FIG. 16 is a view illustrating a pizza base shaping method of shaping four bread pieces D by using the pizza base shaping tool 3 and illustrates a state where both ends of the handle 24 are located at the positions without the guide 29 of the die receiver 25.

The pizza base shaping tool 3 of the third embodiment is different from the pizza base shaping tool 2 of the second embodiment in that the bottom surface d of the pressing plate 13 of the cutting die 21 has a different shape and a protrusion $K_1$ is formed in the bottom surface d of the pressing plate 13 of the cutting die 31. Further, the thickness or the material of the slipping sheet 30 is limited compared to the first and second embodiments. Hereinafter, a component having the same shape and structure as the pizza base shaping tools 1 and 2 is indicated by the same reference sign. Here, the repetitive description thereof will be omitted and only the difference thereof will be described.

As illustrated in FIG. 15, the bottom surface d of the pressing plate 13 of the cutting die 31 of the pizza base shaping tool 3 is provided with the protrusion $K_1$ as a convex portion K which protrudes downward so as to concentrate the pressing force. The protrusion $K_1$ is formed in a thin bar shape of which the cross-section is substantially rectangular, and has a length substantially equal to the diameter of the pressing plate 13 at the center of the circular pressing plate 13. Further, the protrusion $K_1$ protrudes at the position intersecting the handle 24 at substantially 90°. Furthermore, the front end of the protrusion K1 has a shape in which the front end comes into line-contact or surface-contact with the top surface of the bread piece D. In the case of the surface-contact, for example, the width of 1 mm to 7 mm is desirable. Further, the protrusion $K_1$ may be integrally formed with the pressing plate 13 or may be formed separately therefrom.

When the bread piece D having a thickness of eight or six sliced bread pieces which are available in the market is used, it is desirable to set the degree of the protrusion $K_1$ in the protruding direction so that the gap w (see FIG. 3) does not exist between the front end of the protrusion $K_1$ and the top surface of the slipping sheet 30 placed on the top surface a of the placement base 16 when the front end of the cutting die blade 22 reaches the bottom surface of the groove F while the bread piece D is not placed or the gap w is 3 mm or less. Further, the slipping sheet 30 is deformed gently according to the shape of the protrusion $K_1$, and is formed of a material or a thickness in which the original shape is not bent or crushed by the deformation thereof. For example, a sheet-shaped material may be resin such as polypropylene (PP), polyvinyl chloride (PVC), and polyethylene (PE) or a sheet-shaped material may be paper, cloth, or the like. Here, the thickness is 0.2 mm to 0.5 mm.

In this way, since the bottom surface d of the pressing plate 13 of the cutting die 31 is provided with the protrusion $K_1$ and the slipping sheet 30 is used which is gently deformed according to the shape of the protrusion $K_1$, the pressing force applied to the handle 24 concentrates on the front end of the protrusion K1 smaller than the bottom surface d (the circle) of the pressing plate 13, and hence the bread piece D may be effectively pressed. Further, the slipping sheet 30 prevents the protrusion $K_1$ from entering the bread piece D, and hence has a function of supporting the smooth movement of the cutting die 31.

Further, since the protrusion K1 is provided at the position intersecting the handle 24 at substantially 90°, the protrusion portion r of the bread piece D may be efficiently cut. In the first and second embodiments, the protrusion portions r are cut when the cutting die blades 12 and 22 of the cutting dies 11 and 21 contact the outer circumferential edge of the placement base 16 or the inner circumferential edge of the outer frame 28 or the cutting die blades 12 and 22 of the cutting dies 11 and 21 contact the top surface c of the flange 17. However, the cutting dies 11 and 21 are adapted to rotate with respect to the die receivers 15 and 25. For this reason, a slight gap is formed between the placement base 16 or the outer frame 28 and the cutting dies 11 and 21 as described above. Further, there is a case in which the cutting die blades 12 and 22 of the cutting dies 11 and 21 do not contact the top surface c of the flange 17 even when a portion in the vicinity of the thick laminated portion p is pressed in accordance with the type of the bread piece D. For that reason, there is a need to increase the number of times of rotation in order to cut the protrusion portion r.

On the contrary, according to the cutting die 31 of the embodiment, when the cutting die 31 is pressed and rotated, the cutting die 31 is inclined by the protruding protrusion $K_1$ as illustrated in FIG. 16, and the front end of the cutting die blade 22 below the handle 24 to which a force is applied from the hand easily reaches the top surface c of the flange 17 (the bottom surface of the groove F), so that the protrusion portion r of the bread piece D may be efficiently cut. Furthermore, in the case of the cutting die 31, the cutting die 31 has an allowance by the inclination degree in that the width of the groove F is large.

Further, since the bottom surface d of the pressing plate 13 of the cutting die 31 is provided with the protrusion $K_1$ which protrudes downward, the bread piece D is not simply pressed and crushed from the upside, but is pressed and stretched in the movement direction by the movement. Further, since the surface of the bread piece D is well kneaded by the rotation of the protrusion K1, air may be easily extracted and a pizza base having a better texture may be made. Further, the bread piece D is stretched like a ripple due to the force application state. Thus, since the contact area increases due to the rippling contact surface in the laminated portion p of the bread piece D, four bread pieces D may be more reliably connected to one another.

Figure 17A:
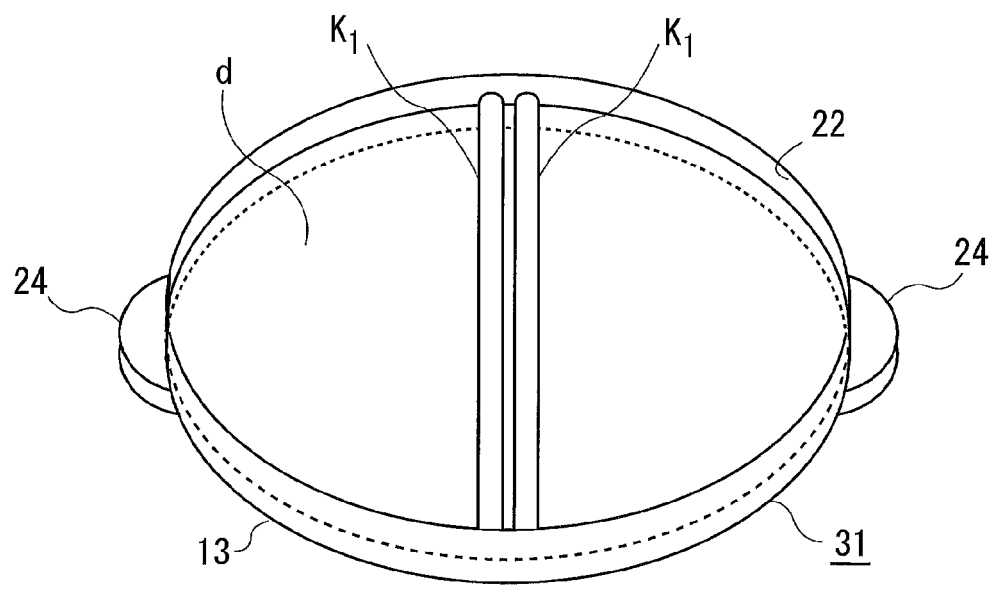
FIG. 17A is a perspective view illustrating a first modified example of a convex portion used to concentrate a pressing force of the cutting die of the pizza base shaping tool of the third embodiment.
Figure 17B:
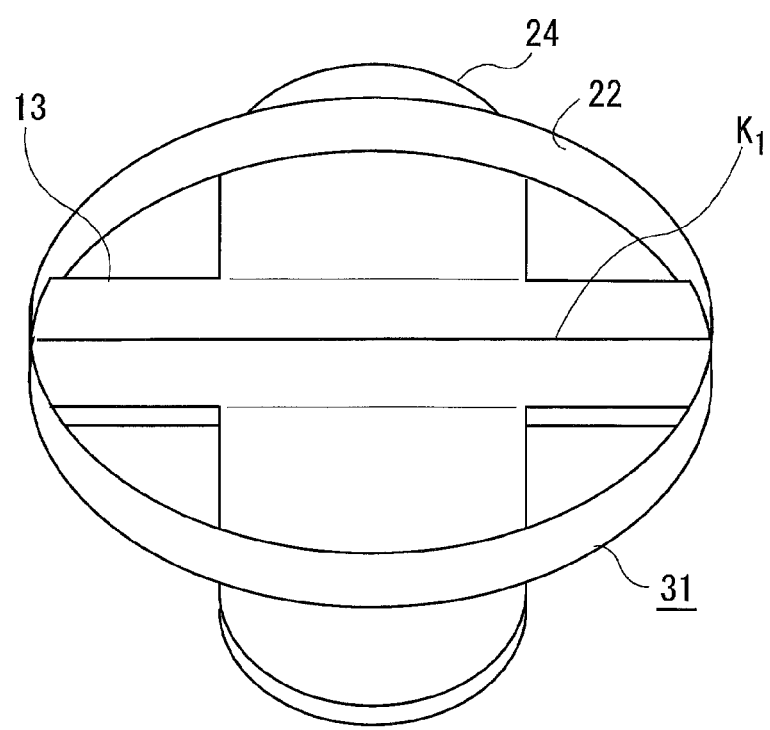
FIG. 17B is a perspective view illustrating a second modified example of a convex portion used to concentrate a pressing force of the cutting die of the pizza base shaping tool of the third embodiment.

Next, a modified example of the cutting die 31 of the embodiment will be described. FIGS. 17A and 17B are schematic perspective views illustrating a state where the modified example of the protrusion $K_1$ as the convex portion K for concentrating the pressing force of the cutting die 31 is viewed from the oblique front upside, where FIG. 17A is a first modified example and FIG. 17B is a second modified example. In the first modified example, two protrusions $K_1$ are provided in parallel at the center portion of the pressing plate 13. When a plurality of the protrusions is provided, the shaping operation may be performed much faster. Further, in the second modified example, the pressing plate 13 is formed as the protrusion $K_1$.

According to the pizza base shaping tool 3 of the third embodiment, since the bottom surface d of the pressing plate 13 is provided with the convex portions K for concentrating the pressing force having the following effect in addition to the effect of the pizza base shaping tool 2 of the second embodiment, the bread piece D may be easily pressed so as to be flat, and hence a pizza base having a better texture may be made. Further, the pizza base may be simply and more reliably shaped in a circular shape.

The shapes, the sizes, and the configurations of the respective members of the pizza base shaping tool 3 are not limited to the above-described embodiment similarly to the first and second embodiments. For example, each protrusion $K_1$ may have various shapes of which the cross-section is a substantially V-shape, a U-shape, a W-shape, a T-shape, and a U-shape as long as the bread piece D may be shaped in a flat shape when the cutting die 31 is pressed and rotated. Further, the installation position of the convex portion K is not limited to the position intersecting the handle 24 similarly to the protrusion $K_1$. For example, the protrusion may be a step having various shapes and provided in the bottom surface d of the pressing plate 13, and the invention is not limited to the protrusion $K_1$ as long as the entire portion other than the protrusion portion r of the bread piece D may be pressed by the rotation of the cutting die 31. For example, the protrusion may be formed by a plurality of convex portions having a fan shape or an oval shape, and the number or the shape of the convex portion may be set in various ways.

Furthermore, a portion without the convex portion K in the bottom surface d of the pressing plate 13 has a function of easily rotating the convex portion K by forming the bread piece D with many overlapping unevenness portions into an average height, and the bottom surface d of the pressing plate 13 and the base portion of the cutting die blade 22 have a function of holding the circumferential edge so that the slipping sheet 30 is not bent. Thus, the pressing plate 13 may have a notch portion or an opening in a part thereof. However, it is desirable not to damage such functions.

Further, even in the cutting die blade 22, the front end thereof may be formed in a gentle ripple shape or a small circular rotation blade may be provided so as to apply the pressing force to a partial portion. Furthermore, since the pizza base shaping method using the pizza base shaping tool 3 of the third embodiment is substantially the same as that of the second embodiment, the repetitive description thereof will be omitted.

Fourth Embodiment

Figure 18A:
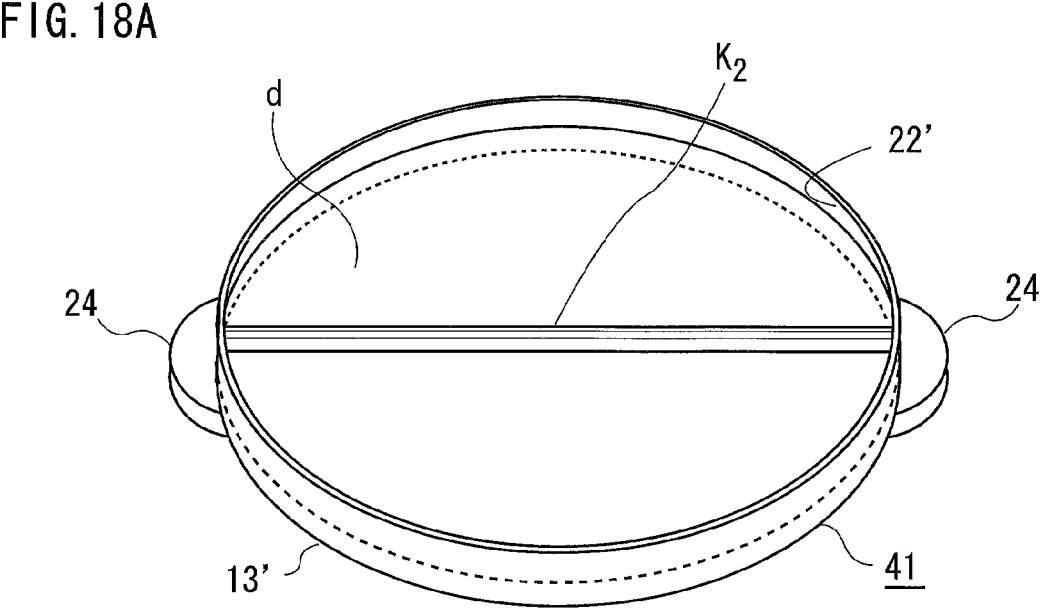
FIG. 18A is a perspective view illustrating a cutting die of a pizza base shaping tool of a fourth embodiment, showing a state where the rear surface of the cutting die is viewed from the oblique front upside.
Figure 18B:
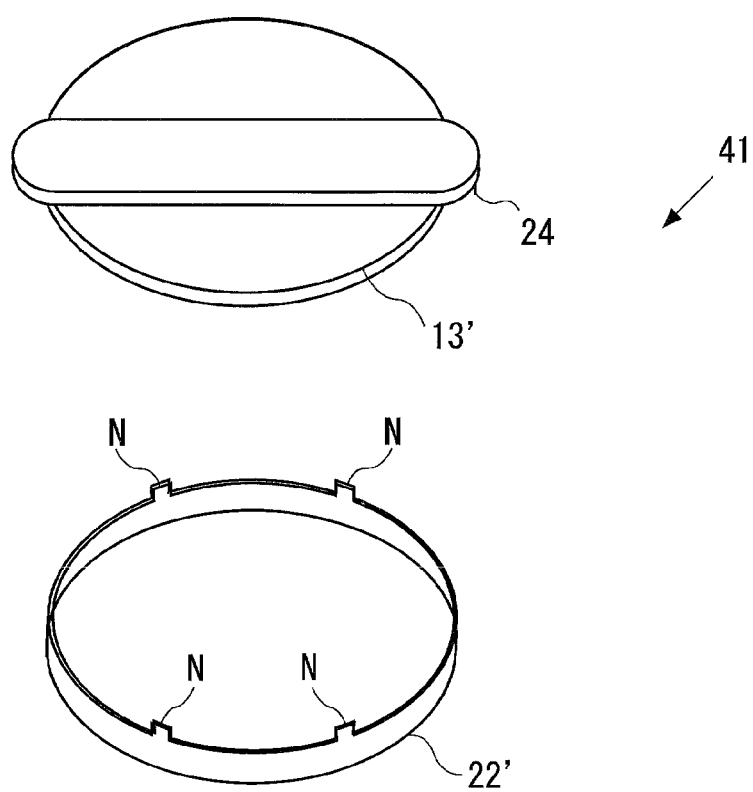
FIG. 18B is a perspective view illustrating a cutting die of a pizza base shaping tool of a fourth embodiment, showing a state where the configuration of the cutting die is viewed from the oblique front upside.
Figure 19:
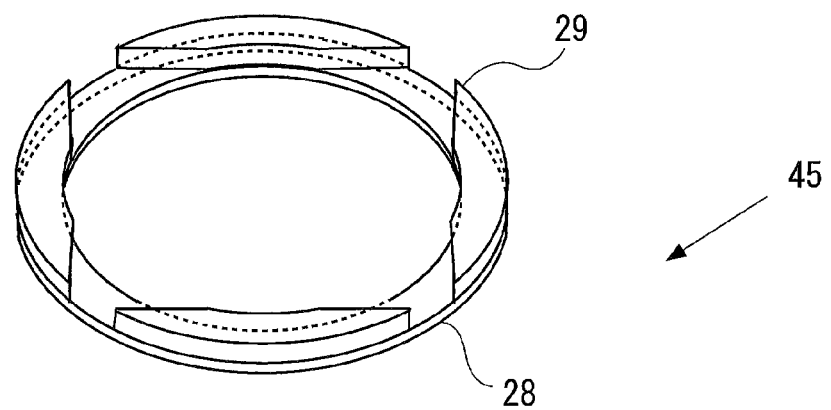
FIG. 19 is a perspective view illustrating a die receiver of the pizza base shaping tool of the fourth embodiment.

Next, a pizza base shaping tool 4 of a fourth embodiment will be described. FIGS. 18A and 18B are schematic views illustrating a cutting die 41 of the pizza base shaping tool 4, where FIG. 18A is a perspective view illustrating a state where the rear surface of the cutting die 41 is viewed from the oblique front upside and FIG. 18B is a perspective view illustrating a state where the configuration of the cutting die 41 is viewed from the oblique front upside. FIG. 19 is a perspective view illustrating a state where the configuration of a die receiver 45 of the pizza base shaping tool 4 is viewed from the oblique front upside.

The pizza base shaping tool 4 of the fourth embodiment is different from the pizza base shaping tool 3 of the third embodiment in that a protrusion $K_2$ as a convex portion K for concentrating the pressing force is provided in parallel to the handle 24. Further, in the cutting die 41, a pressing plate 13' and a cutting die blade 22' are formed separately from each other. The die receiver 45 includes an elastic annular member M which is disposed at the bottom portion of the groove F in addition to the second and third embodiments. Hereinafter, a component having the same shape and structure as the pizza base shaping tools 1, 2, and 3 is indicated by the same reference sign. Here, the repetitive description thereof will be omitted and only the difference thereof will be described.

As illustrated in FIG. 18A, the bottom surface d of the pressing plate 13' of the cutting die 41 of the pizza base shaping tool 4 is provided with the protrusion $K_2$ which protrudes downward in parallel to the handle 24. The shape of the protrusion $K_2$ is the same as that of the third embodiment. With such a configuration, a force applied to the handle 24 may be effectively transmitted to the protrusion $K_2$, and hence the bread piece D may be more simply shaped in a flat plate shape.

As illustrated in FIG. 18B, the cutting die 41 has a configuration in which the pressing plate 13' and the handle 24 are separated from the cutting die blade 22'. The circumferential edge of the bottom surface d of the pressing plate 13' is provided with eight locking concave portions (not illustrated), and the upper portion of the cutting die blade 22' is provided with four protrusions N which are detachably locked to the locking concave portions. Eight locking concave portions of the pressing plate 13' are formed at the same interval, four locking concave portions located at the cross-shaped position make one set, and the locking concave portions have a different depth by the set of the locking concave portions.

With such a configuration, it is possible to change the length of the cutting die blade 22' protruding from the pressing plate 13', and hence to change the gap (see FIG. 16) between the top surface a of the placement base 16 and the bottom surface i of the slipping sheet 30 when the die receiver 25 is covered by the cutting die 41. Thus, when six sliced bread pieces D are used as a material, the locking concave portions having a large gap are selected. Meanwhile, when eight sliced bread pieces D are used as a material, the locking concave portions having a small gap are selected. Accordingly, even a material having a different thickness may be reliably pressed. Furthermore, the pizza base shaping tool 4 includes two kinds or more cutting die blades 22' having different lengths as one set of (four) locking concave portions of the pressing plate 13', and may handle the thickness of the bread piece D to be used.

Next, the configuration of the die receiver 45 will be described. As illustrated in FIG. 5B, the laminated portion p and the single layer portion q are formed when the bread pieces D overlap one another. Thus, when the gap (see FIG. 16) between the top surface a of the placement base 16 and the bottom surface i of the slipping sheet 30 matches the laminated portion p, there is a case in which the single layer portion q is not sufficiently pressed. In order to solve such a problem, the die receiver 25 has a configuration in which an annular member M is disposed in the bottom portion (see FIGS. 14A and 14B) of the groove F. Thus, the gap between the top surface a of the placement base 16 and the bottom surface i of the slipping sheet 30 when the die receiver 25 is covered by the cutting die 41 due to the pressing of the handle 24 may be changed. The annular member M has elasticity harder than the bread piece D, and is formed of, for example, rubber. Here, it is desirable that the friction coefficient of the top surface be small so that the cutting die 41 may be easily rotated.

Since the position of the single layer portion q may be predicted by the position of the guide 29 in the pressing state, a pizza base having a good taste as a whole may be made by strongly pressing the handle 24 when the handle reaches the position above the single layer portion q. Furthermore, although the thickness of the placed bread piece D is concerned, it is desirable that the gap between the lower end of the protruding portion of the protrusion $K_2$ of the slipping sheet 30 and the top surface a of the placement base 16 do not exist or the gap is 3 mm or less when the front end of the cutting die blade 22' reaches the top surface of the annular member M of the bottom portion of the groove F (in a state where the annular member M is not deformed) in a state where the bread piece D is not placed.

According to the pizza base shaping tool 4 of the fourth embodiment, the following effect is obtained in addition to the effects of the pizza base shaping tools 1 and 2 of the first and second embodiments. Since a configuration is employed in which the protrusion $K_2$ is provided in parallel below the handle 24 and the protruding length of the cutting die blade 22' may be changed in response to the thickness of the bread piece D to be used, the bread pieces D having different thicknesses may be easily pressed in a flat shape. Since the cutting die blade 22' having an appropriate length is used in response to the thickness of the bread piece D and the protrusion portion r of the bread piece D may be cut by causing the front end of the cutting die blade 22' to contact the annular member M, the amount of the scrape of the bread piece D may be decreased. Further, it is possible to make a pizza base having a good texture as a whole by adding the annular member M to the die receiver 25. Further, since the cutting die blade 22' is separately shaped, the cutting die blade may be replaced when the front end thereof is abraded, and hence the pizza base shaping tool 4 may be used for a long period of time.

Furthermore, the shapes, the sizes, and the configurations of the respective members of the pizza base shaping tool 4 are not limited to the above-described embodiment similarly to the first and second embodiments. The protrusion $K_2$ may have various shapes similarly to the third embodiment, and the convex portion K for concentrating the pressing force does not need to be parallel to the handle 24 as in the protrusion $K_2$. The protrusion may have various shapes similarly to the third embodiment.

Further, the cutting die blade 22' is not limited to the above-described configuration as long as the cutting die blade is detachable, and the other attachment/detachment function may be set. For example, various structures may be employed as long as the pressing plate 13' and the cutting die blade 22' may be attached to or separated from each other on the contrary to the above-described configuration. That is, various structures may be a structure in which the detachable protrusion formed in the circumferential edge of the bottom surface d of the pressing plate 13' is detachably fitted to the locking concave portion formed in the upper portion of the cutting die blade 22', a detachable structure in which the detachable protrusion is not provided in the upper end of the cutting die blade 22', the annular groove is provided in the circumferential edge of the bottom surface d of the pressing plate 13', and the upper portion of the cutting die blade 22' is fitted, and a structure in which the attachment/detachment function is provided in the side surface of the pressing plate 13' and the cutting die blade 22' has an engagement function with respect to the side surface. Furthermore, when the annular groove is provided in the circumferential edge of the bottom surface d of the pressing plate 13', the size of the gap may be more easily changed by also attaching the annular member M to the annular groove. Furthermore, since the pizza base shaping method using the pizza base shaping tool 4 of the fourth embodiment is substantially the same as that of the second embodiment, the repetitive description thereof will be omitted.

Fifth Embodiment

Figure 20A:
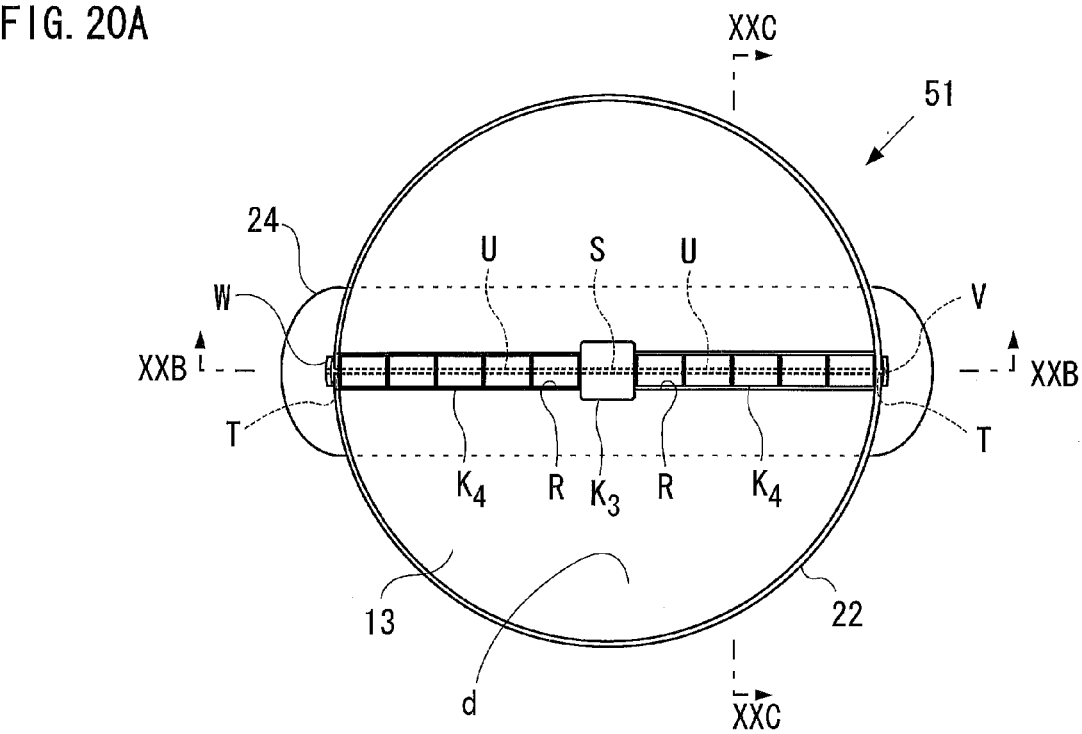
FIG. 20A is a bottom view illustrating a cutting die of a pizza base shaping tool of a fifth embodiment.
Figure 20B:
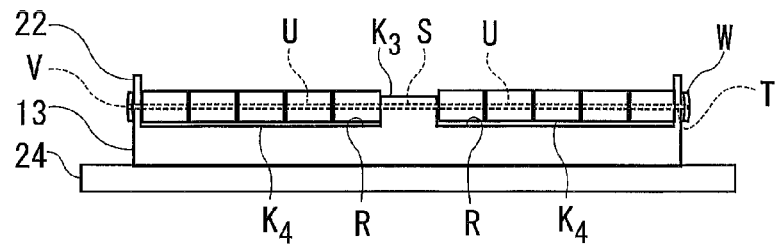
FIG. 20B is a cross-sectional view taken along the part XXB-XXB of FIG. 20A.
Figure 20C:
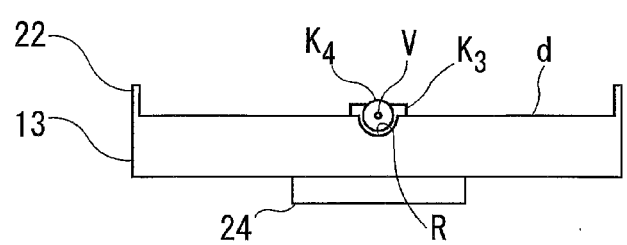
FIG. 20C is a cross-sectional view taken along the part XXC-XXC of FIG. 20A.
Figure 20D:
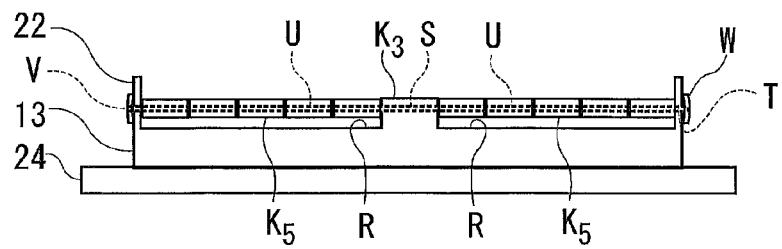
FIG. 20D is a cross-sectional view taken along the part XXB-XXB of FIG. 20A in a state where the roller members are replaced by the small-diameter roller members.

Next, a pizza base shaping tool 5 of a fifth embodiment will be described. The pizza base shaping tool 5 is different from the pizza base shaping tool 3 of the third embodiment in that a plurality of roller members $K_4$ is used as the convex portion K for concentrating the pressing force so that the cutting die 51 is easily rotated. FIGS. 20A to 20D are schematic views illustrating a cutting die 51 of the pizza base shaping tool 5, where FIG. 20A is a bottom view of the cutting die 51, FIG. 20B is a cross-sectional view taken along the part XXB-XXB of FIG. 20A, FIG. 20C is a cross-sectional view taken along the part XXC-XXC of FIG. 20A, and FIG. 20D is a cross-sectional view taken along the part XXB-XXB of FIG. 20A in a state where the roller members $K_4$ are replaced by the small-diameter roller members $K_5$. Hereinafter, a component having the same shape and structure as the pizza base shaping tools 1, 2, 3, and 4 is indicated by the same reference sign. Here, the repetitive description thereof will be omitted and only the difference thereof will be described.

As illustrated in FIGS. 20A to 20D, the center of the bottom surface d of the pressing plate 13 of the cutting die 51 is provided with a prismatic convex portion $K_3$ having opposite side surfaces parallel to the longitudinal direction of the handle 24, and the attachment groove R having a semi-circular cross-section is formed from the other opposite side surface of the convex portion $K_3$ to the circumferential edge of the pressing plate 13. The curvature of the attachment groove R is slightly larger than that of the roller member $K_4$ having a substantially columnar shape and forming the convex portion K, and the attachment groove R accommodates the roller member $K_4$ so that a part of the circumferential wall thereof protrudes from the bottom surface d of the pressing plate 13.

The convex portion $K_3$ is provided with a support hole S as a thin columnar hole which penetrates the convex portion from one side surface to the other side surface thereof in parallel to the attachment groove R. A small circular locking hole T is provided at the opposite positions in the cutting die blade 22, and two locking holes T and the support hole S exist on the same line. Further, the shaft portion of the roller member $K_4$ is provided with a penetration hole U, and the support hole S, the locking hole T, and the penetration hole U substantially have the same diameter, and are slightly larger than the diameter of the rotation shaft V as the bar-shaped member having a circular cross-section and inserted into these holes. The plurality of roller members $K_4$ is rotatably supported by the rotation shaft V. Here, the center of the rotation shaft V is held by the support hole S, and both ends thereof are held by the locking hole T.

The plurality of roller members $K_4$ is replaceably attached to the attachment groove R of the cutting die 51 by the rotation shaft V inserted through the penetration hole U and the locking member W detachably locking the rotation shaft to the cutting die blade 22. Since the roller members $K_4$ having different diameters are attached, the roller member may be used in response to the thickness of the bread piece D. Furthermore, it is desirable to form the rotation shaft V by a material which is not bent in the pressed state.

When the cutting die 51 is rotated, the movement distance is different at the center and the outside thereof, and hence the outer portion of each roller member $K_4$ rotates and slips. Thus, in order to easily move the cutting die by decreasing the slipping distance, it is desirable to shorten the axial length of the roller member $K_4$ and to provide the plurality of roller members $K_4$. Further, the roller member $K_4$ may have a configuration in which a member (not illustrated) that absorbs a difference in the movement distance is disposed around the rotation shaft V. Furthermore, the size of the convex portion $K_3$ having a substantially square shape is substantially equal to the thickest portion (the portion obtained by overlapping four bread pieces D) of the laminated portion p. When the portion is pressed first, the rotation of the cutting die 51 may be easily performed.

Figure 21:
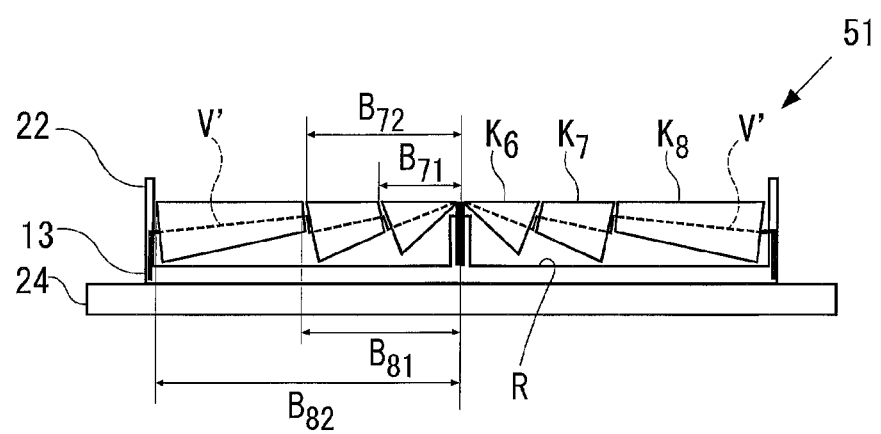
FIG. 21 is a schematic cross-sectional view illustrating a modified example of a roller member of the pizza base shaping tool of the fifth embodiment.

FIG. 21 is a cross-sectional view schematically illustrating the modified example of the convex portion K for concentrating the pressing force of the roller member and illustrating a state where roller members $K_6$, $K_7$, and $K_8$ are cut along the center axes thereof. Specifically, a combination of the conical roller member $K_6$ and truncated conical roller members $K_7$ and $K_8$ is used, and the roller members $K_6$, $K_7$, and $K_8$ are supported by the pressing plate 13 and the cutting die blade 22 through rotation shafts V which are bent so that the base lines become straight at the side contacting the bread piece D. In the truncated conical roller members $K_7$ and $K_8$, the ratio between the length of the circumference of the top surface and the length of the circumference of the bottom surface is substantially the same as the ratio between the length $B_{71}$ and $B_{81}$ from the center of the pressing plate 13 to the top surface and the length $B_{72}$ and $B_{82}$ from the center of the pressing plate 13 to the bottom surface. Thus, since the roller members $K_6$, $K_7$, and $K_8$ rotate without any slip, the cutting die 51 may be rotated more smoothly. Furthermore, the gap between each lower end of the protruding portions of the roller members $K_6$, $K_7$, and $K_8$ of the slipping sheet 30 and the top surface a of the placement base 16 is the same as that of the fourth embodiment.

The shapes, the sizes, and the configurations of the respective members of the pizza base shaping tool 5 are not limited to the above-described embodiment, and the number of the roller members $K_4$, $K_5$, $K_6$, $K_7$, and $K_8$ is not limited thereto. In order to stably hold the rotation shaft V, the center of the pressing plate 13 is provided with one convex portion $K_3$, but the number thereof may be increased. Alternatively, the convex portion may not be provided. Further, in the embodiment, the convex portions K ($K_4$, $K_5$, $K_6$, $K_7$, and $K_8$) are provided in parallel to the handle 24, but may be provided so as to intersect one another similarly to the third embodiment. As long as a plurality of members may be rotated, the invention is not limited to the roller members $K_4$, $K_5$, $K_6$, $K_7$, and $K_8$. For example, a member such as a ball or a tire shape may be used. Further, the arrangement unit and the support unit described above are not limited to the above-described configuration. Even when a small gap is formed between the roller members, the roller members may be rotated easily by interposing the slipping sheet 30 therebetween. Accordingly, even when a thin annular protrusion portion is formed in the pizza base shaped by the gap, this protrusion portion may be used as a standard for the placement of the fillings in a concentric shape. Furthermore, since the pizza base shaping method using the pizza base shaping tool 5 of the fifth embodiment is substantially the same as that of the second embodiment, the repetitive description thereof will be omitted.

Sixth Embodiment

Figure 22A:
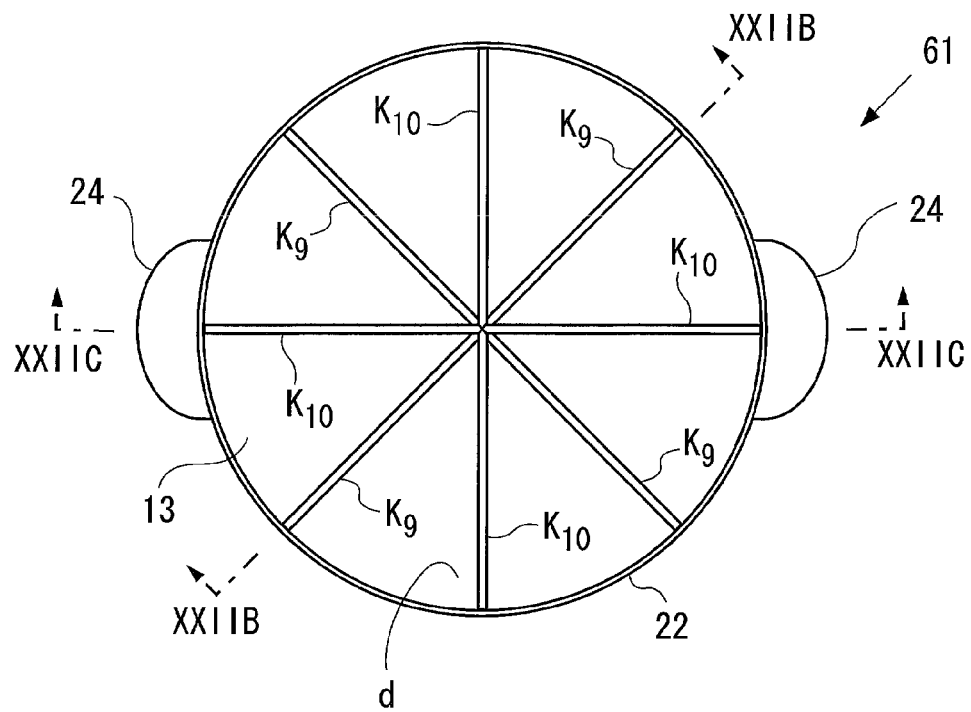
FIG. 22A is a bottom view illustrating a cutting die of a pizza base shaping tool of a sixth embodiment.
Figure 22B:
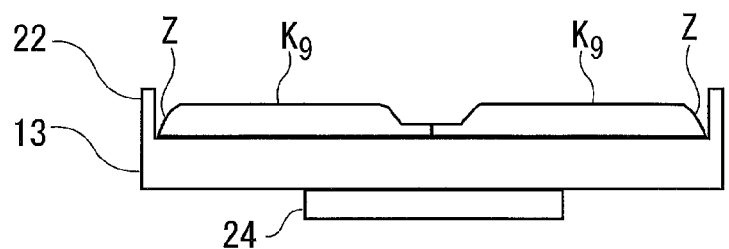
FIG. 22B is a cross-sectional view taken along the part XXIIB-XXIIB of FIG. 22A.
Figure 22C:
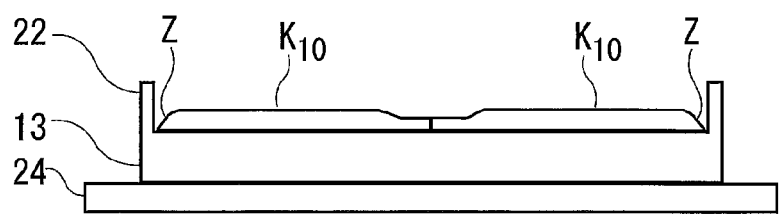
FIG. 22C is a cross-sectional view taken along the part XXIIC-XXIIC of FIG. 22A.
Figure 23:
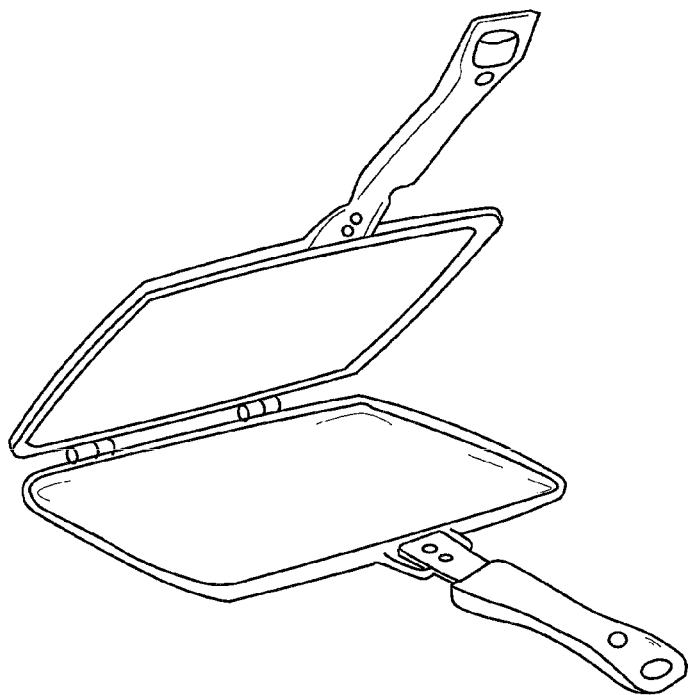
FIG. 23 is a perspective view illustrating a tool of Non-Patent Literature 1 as the related art.

Next, a pizza base shaping tool 6 of a sixth embodiment will be described. The pizza base shaping tool 6 is different from the pizza base shaping tools 3, 4, and 5 of the third to fifth embodiments in that the convex portion K for concentrating the pressing force is different. FIGS. 22A to 22C are schematic views illustrating a cutting die 61 of the pizza base shaping tool 6, where FIG. 22A is a bottom view of the cutting die 61, FIG. 22B is a cross-sectional view taken along the part XXIIB-XXIIB of FIG. 22A, and FIG. 22C is a cross-sectional view taken along the part XXIIC-XXIIC of FIG. 22A.

As illustrated in FIGS. 22A to 22C, the bottom surface d of the cutting die 61 is provided with columnar protrusions $K_9$ and $K_{10}$ of which the cross-sections are substantially rectangular and which protrude radially from the center of the pressing plate 13 to the circumferential edge of the pressing plate 13 as the convex portions K. In this way, since the convex portions K are radially provided, the entire bread pieces D on the placement base 16 are pressed by several protrusions $K_9$ and $K_{10}$ when the cutting die 61 is rotated in one direction by, for example, 25°, is returned to the original position, and is rotated in the other direction by 25°. Thus, the rotation angle decreases compared to the third to fifth embodiments, and hence the bread piece D may be pressed easily and fast. Accordingly, the pressing operation may be conveniently performed.

As illustrated in FIG. 5B, the bread piece D placed on the placement base 16 includes the laminated portion p and the single layer portion q. Further, the laminated portion p includes a position (a portion having a substantially rectangular shape and intersecting at a substantially cross shape) where four bread pieces D overlap one another and a position (a portion not intersecting a substantially cross shape) where two bread pieces overlap each other. In order to correspond to the overlap state of the bread pieces D, the protrusion $K_9$ and the protrusion $K_{10}$ are formed so that the lengths in the protruding direction are different. Specifically, since four protrusions $K_9$ provided in the inclination direction press the single layer portion q of the bread piece D as illustrated in FIGS. 22A to 22C, the lengths in the protruding direction are long. Further, since the protrusions $K_{10}$ provided in the longitudinal direction and the width direction press the laminated portion p of the bread piece D, the lengths in the protruding direction are short.

Further, the length in the protruding direction of the center portion as the position where four bread pieces D overlap one another in the laminated portion p is shorter than those of the other portions. Furthermore, it is desirable that the gap between the lower end of the protruding portion of the convex portion K of the slipping sheet 30 and the top surface a of the placement base 16 when the front end of the cutting die blade 22 reaches the top surface of the annular member M of the bottom portion of the groove F (when the annular member M is not deformed) while the bread piece D is not placed thereon be, for example, 1 to 20% of the thickness of the bread pieces D overlapping one another or the thickness of one bread piece D in the non-pressed state.

As illustrated in FIGS. 22B and 22C, the protrusions $K_9$ and $K_{10}$ are provided with notch portions Z which are obliquely notched at the end near the circumferential edge of the pressing plate 13. Accordingly, the circumferential edge of the shaped pizza base is higher than the other portions. Thus, even when the fillings such as cheese are placed on the pizza base to the marginal end thereof and baked, it is possible to prevent the flow of the cheese and the like due to the wall. Further, since the circumferential edge of the pizza base is a portion to which a heat is transmitted, it is possible to enjoy the crisp texture even when the pizza base is thick.

According to the pizza base shaping tool 6, it is possible to handle a difference in the thickness of the bread piece D (the number of the bread pieces) placed on the placement base 16 by a configuration in which the protrusions $K_9$ and $K_{10}$ are provided and the lengths in the protruding direction are different depending on the arrangement positions or a configuration in which the lengths in the protruding direction of one protrusion $K_9$ and one protrusion $K_{10}$ are changed, and hence to reliably press not only the laminated portion p, but also the single layer portion q. Although some unevenness portions may be formed on the surface, a pizza base having a real texture may be made. Furthermore, the center portion of the pizza base is slightly raised. Thus, since the center of the pizza base is easily recognized, the mark is used for the placement of the fillings or the cutting of the pizza. Further, when the marks are attached to the top surfaces of the outer frame 28 and the guide 29 at the same interval, the fillings may be further uniformly placed thereon. Alternatively, a configuration may be employed in which eight convex portions are provided on the circumferential edge of the top surface a of the placement base 16 at the same interval and the marks are formed on the pizza base.

The shapes, the sizes, and the configurations of the pizza base shaping tool 6 are not limited to the above-described embodiment. Here, it is possible to change the lengths in the protruding direction in response to the arrangement of the laminated portion p and the single layer portion q of the overlapping bread pieces D or the number of the bread pieces D of the laminated portion p and to reliably press the bread piece D even at the laminated portion p or the single layer portion q by changing the lengths in the protruding direction. Furthermore, since the pizza base shaping method using the pizza base shaping tool 6 of the sixth embodiment is substantially the same as that of the second embodiment, the repetitive description thereof will be omitted.

The invention is not limited to the above-described embodiments of the invention. That is, the invention is not limited to the above-described configuration illustrated in the drawings as long as the pressing plate 13 or 13', the cutting die blade 12, 22, or 22', the slipping sheet 10 or 30, and the placement base 16 are provided and a substantially circular pizza base giving an actual texture may be simply shaped by using the bread piece D, and various modifications may be, of course, made without departing from the spirit of the invention. A case has been exemplified in which four rectangular sliced bread pieces are used while two sliced bread pieces are respectively disposed in the horizontal and vertical directions, but the larger pizza base may be made when nine sliced bread pieces are used while three sliced bread pieces are respectively disposed in the horizontal and vertical directions.

Further, according to the pizza base shaping tool of the invention, since the pizza base may be simply made, the pizza base shaping tool may be provided as a cooking toy for a child. Further, when the cutting dies 11, 21, 31, 41, 51, and 61 are electrically rotated by motors in order to shape the pizza base in a circular and thin plate shape, the pizza base shaping tool may be used for the industrial purpose.

When the pizza base shaping tool and the pizza base shaping method of the invention are used, the sliced bread may be shaped in, for example, flat food such as pita or naan other than the pizza base. Further, even one bread piece may be shaped as the pizza base. Further, a food material other than the bread may be shaped in a flat shape.

REFERENCE SIGNS LIST

1, 2, 3, 4, 5, 6 Pizza base shaping tool
11, 21, 31, 41, 51, 61 Cutting die 12, 22, 22' Cutting die blade
13, 13' Pressing plate
10, 30 Slipping sheet
15, 25 Die receiver
16 Placement base
17 Flange
24 Handle
28 Outer frame
29 Guide
A, B Mark
C Recess
D Bread
E Recess
F Groove
K Convex portion
M Annular member
Z Notch portion
p Laminated portion
q Single layer portion
r Protrusion portion

The invention claimed is:

1. A pizza base shaping tool for making a disk-shaped pizza base having a predetermined diameter, the pizza base shaping tool comprising:
a die receiver which serves as a seat;
a cutting die which presses and shapes at least one sliced bread piece; and
a circular slipping sheet which is disposed between the die receiver and the cutting die and has substantially the same diameter as the predetermined diameter,
wherein the die receiver includes a disk-shaped placement base having the predetermined diameter and used to place the at least one bread piece thereon,
the cutting die includes a pressing plate which compresses the at least one bread piece from the upside and a cutting die blade which is provided so as to protrude in a direction perpendicular to a pressing surface of the pressing plate and is used to cut the at least one bread piece into the predetermined diameter, and
when the slipping sheet is positioned to the at least one bread piece placed on the placement base so as to cover the at least one bread piece and is pressed and rotated while the cutting die covers the slipping sheet from the upside, the pressing plate compresses the at least one bread piece while slipping on the slipping sheet and a part of a circumferential edge of the at least one bread piece exceeding from the placement base is cut by the cutting die blade.

2. The pizza base shaping tool according to claim 1, wherein the pressing surface of the pressing plate is provided with a convex portion for concentrating a pressing force, and
the slipping sheet has flexibility and smoothly moves the convex portion.

3. The pizza base shaping tool according to claim 2, wherein the convex portion is a protrusion which extends from a portion serving as a center of the pressing plate when the pressing plate is rotated to a circumferential edge thereof.

4. The pizza base shaping tool according to claim 1, wherein the die receiver further includes a flange which extends outward from a circumferential edge of a lower end of the placement base and a guide which protrudes upward from a top surface of the flange, and
the guide is adapted to guide a position when the cutting die covers the placement base on which the at least one bread piece and the slipping sheet are placed.

5. The pizza base shaping tool according to claim 4, wherein the guide is adapted to perform a positioning when the at least one bread piece, which is a rectangular shape, is placed on the placement base.

6. The pizza base shaping tool according to claim 1, wherein the cutting die blade is annular in planar view.

7. The pizza base shaping tool according to claim 6, wherein a inner diameter of the cutting die blade is larger than the diameter of the placement base by 2 mm to 4 mm.

8. The pizza base shaping tool according to claim 1, wherein the cutting die further includes a substantially plate-shaped handle which is provided in a top surface of the pressing plate, and
the handle includes a portion which protrudes outward from a circumferential edge of the pressing plate so that the handle is pressed downward by a palm from a position substantially just above the cutting die blade.

9. The pizza base shaping tool according to claim 1, wherein the slipping sheet is made of resin.

10. The pizza base shaping tool according to claim 1, wherein the die receiver further includes a flange, a outer frame and a groove,
the flange extends outward from a circumferential edge of a lower end of the placement base,
the outer frame formed in a circular ring shape, which extends upward from a top surface of the flange,
the groove is a circular recess formed between the placement base and the outer flame.

11. The pizza base shaping tool according to claim 4, wherein the guide is adapted to perform a positioning when the slipping sheet is placed on the placement base.

12. The pizza base shaping tool according to claim 4, wherein the guide is a substantially pillar shape having a curved side facing the placement base, and a surface of the curved side is formed substantially the same curvature as a outer circumference of the placement base.

13. The pizza base shaping tool according to claim 5, wherein the guide is a substantially pillar shape having plane side, and a horizontal cutting line of the plane side is on a tangential line of a outer circumference of the placement base.

14. A base shaping tool according to claim 8, wherein recesses are formed in the both side walls in a longitudinal direction of the handle so as to face each other.

15. A pizza base shaping method of making a disk-shaped pizza base having a predetermined diameter, the pizza base shaping method comprising:
placing a plurality of sliced bread pieces onto a top surface of a disk-shaped placement base having the predetermined diameter so that the adjacent bread pieces partially overlap one another;
placing a circular slipping sheet having substantially the same diameter as the predetermined diameter onto top surfaces of the bread pieces so that the center of the slipping sheet is located above the center of the placement base in a vertical direction;
placing a pressing plate provided with a circular cutting die blade having substantially the same inner diameter as the predetermined diameter onto the slipping sheet so that the center of the cutting die blade is located above the center of the placement base in the vertical direction;
rotating the pressing plate and the cutting die blade while pressing the pressing plate and the cutting die blade from the upside and cutting part of the bread pieces exceeding from the placement base by the cutting die blade so as to shape the bread pieces into a circular shape having the predetermined diameter; and rotating the pressing plate while pressing the pressing plate from the upside so as to connect the overlap portions of the bread pieces by the pressing plate and shape the bread pieces in a thin thickness.

16. The pizza base shaping tool according to claim 1, wherein a top surface of the placement base has a non-slip structure that disturbs a movement of the placed at least one bread piece when the cutting die is rotated.

17. The pizza base shaping tool according to claim 1, wherein the pressing plate is circular in planar view, and a diameter of the pressing plate is substantially equal to the diameter of the placement base.

18. The pizza base shaping tool according to claim 1, wherein a value of a length of the cutting die blade protruding downward from a bottom surface of the pressing plate is substantially the same as a total value of a thickness of the placement base and a thickness of the slipping sheet.

* * * * *